United States Patent

Kooy et al.

Patent Number: 5,588,517
Date of Patent: Dec. 31, 1996

[54] CLUTCH OPERATING APPARATUS

[75] Inventors: Ad Kooy, Lauf; Helmar Bier, Ettlingen; Norbert Mebus, Bühlertal, all of Germany

[73] Assignee: LuK Lamellen und Kupplungsbau GmbH, Bühl, Germany

[21] Appl. No.: 305,519

[22] Filed: Sep. 13, 1994

[30] Foreign Application Priority Data

Sep. 13, 1993 [DE] Germany .......................... 43 30 886.4
May 25, 1994 [DE] Germany .......................... 44 18 023.3

[51] Int. Cl.$^6$ ........................................ F16D 13/54
[52] U.S. Cl. ......................... 192/70.25; 192/111 A
[58] Field of Search .................... 192/70.25, 111 A

[56] References Cited

U.S. PATENT DOCUMENTS

| | | | |
|---|---|---|---|
| 3,478,853 | 11/1969 | Kraeplin | 192/111 A |
| 3,866,733 | 2/1975 | Linn et al. | 192/111 A |
| 3,868,006 | 2/1975 | Linn et al. | 192/111 A |
| 3,871,500 | 3/1975 | Linn et al. | 192/111 A |
| 3,876,049 | 4/1975 | Linn et al. | 192/111 A |
| 4,445,600 | 5/1984 | Schmidt | 192/111 A X |
| 5,180,335 | 1/1993 | Maucher et al. | 74/574 X |
| 5,456,345 | 10/1995 | Bissett | 192/70.25 X |

FOREIGN PATENT DOCUMENTS

2658763-A1  2/1990  France.

Primary Examiner—Andrea L. Pitts
Attorney, Agent, or Firm—Darby & Darby

[57] ABSTRACT

An apparatus which is used to operate a clutch in the power train between the prime mover and the transmission of a motor vehicle has a bearing which can be moved axially against the prongs of the clutch spring to change the state of the clutch between an engaged and a disengaged condition. In addition to being movable in response to the depression of a clutch pedal, the bearing is also movable by a compensating unit forming part of the clutch operating apparatus and serving to compensate for wear upon the friction linings of the clutch disc and, if necessary, upon the pressure plate and the counterpressure plate of the clutch. The means for moving the bearing in order to compensate for such wear includes two sets of complementary ramps or cams which can move the bearing toward the pressure plate in response to angular movement of an annular member which carries one set of the cams or ramps and which is biased by an energy storing element to turn in a direction necessary to move the bearing in order to compensate for wear, i.e., in addition to that movement of the bearing which is necessary to change the condition of the clutch.

45 Claims, 6 Drawing Sheets

Fig.7
Fig.6
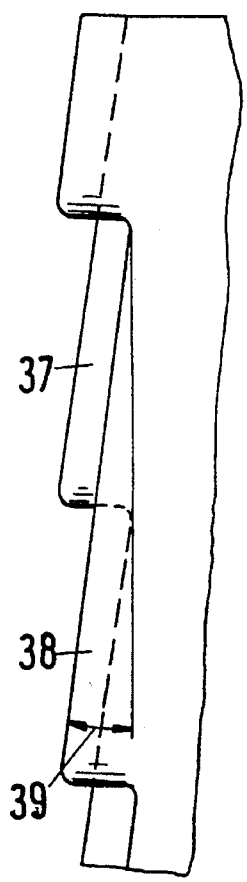
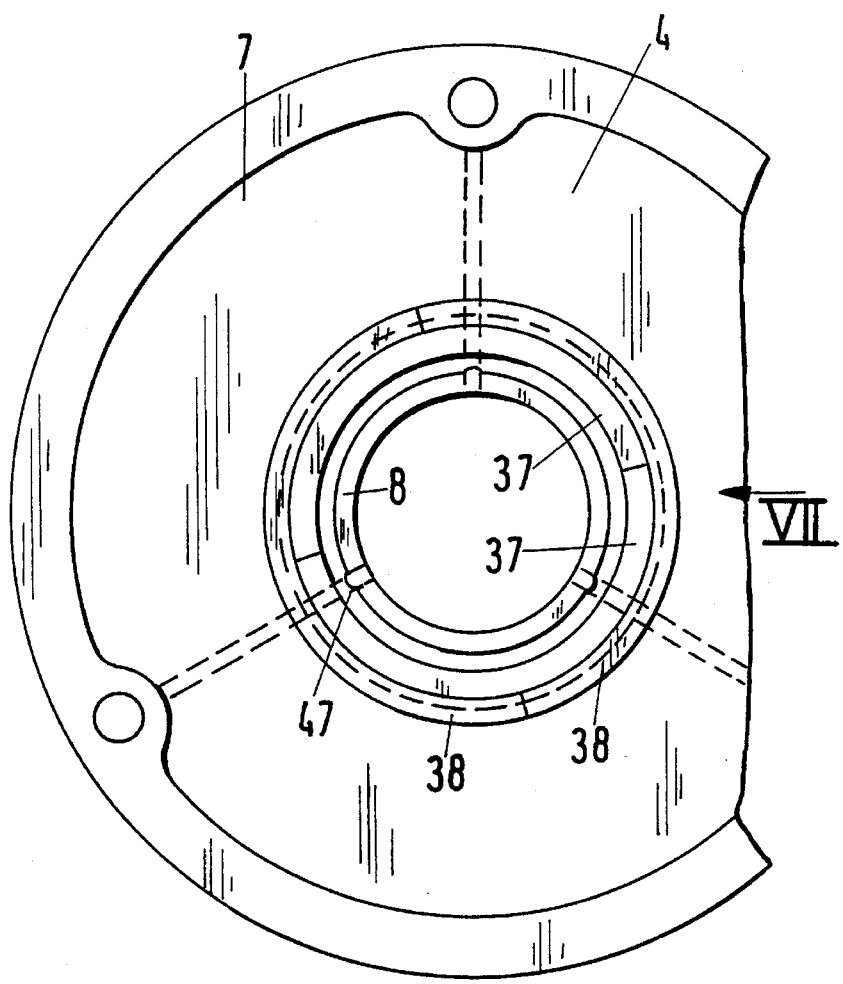

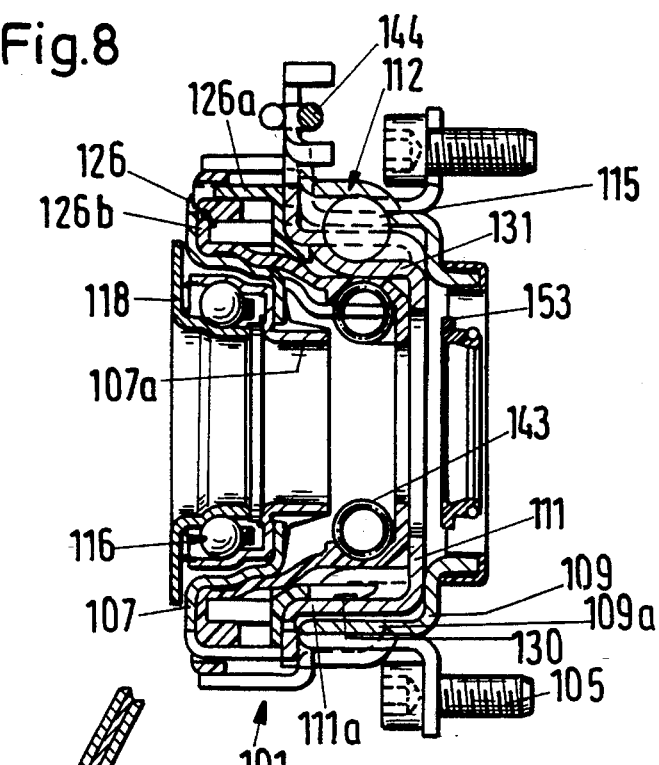
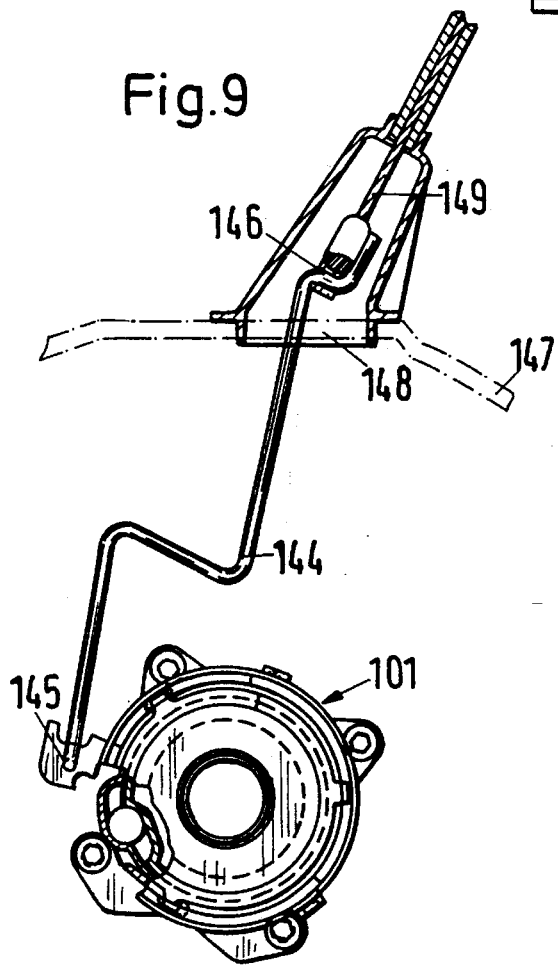
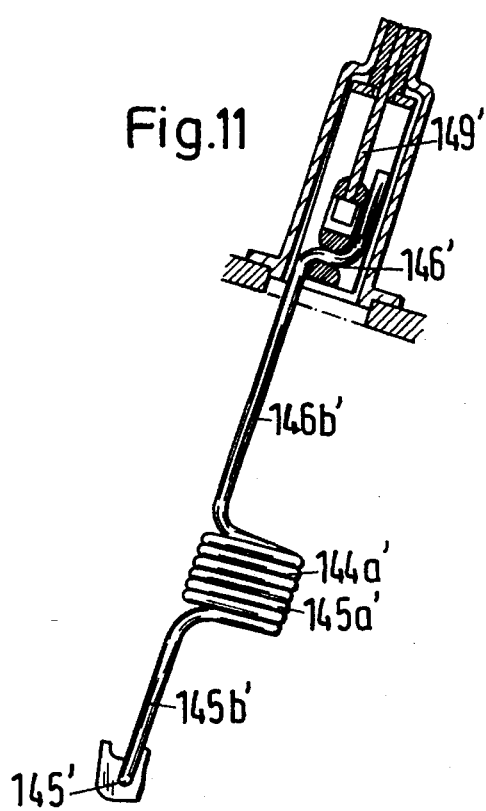

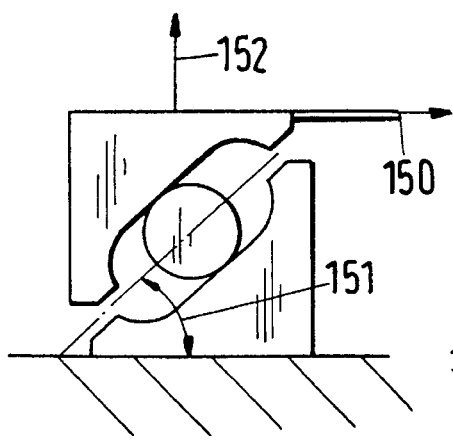
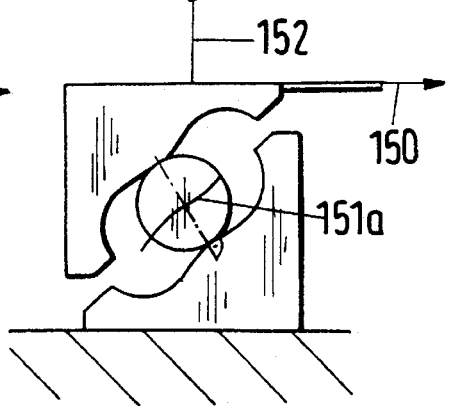
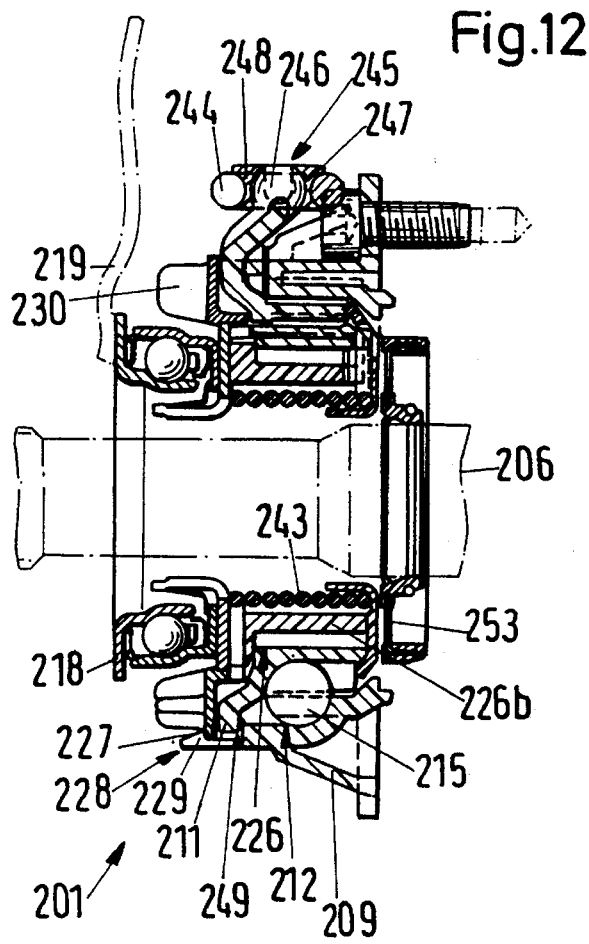
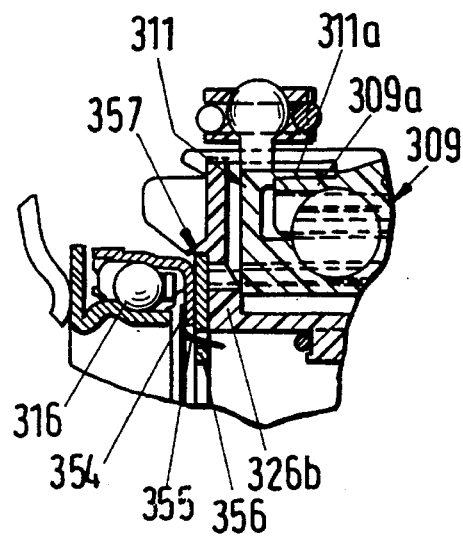

CLUTCH OPERATING APPARATUS

BACKGROUND OF THE INVENTION

The present invention relates to improvements in apparatus for operating clutches. More specifically, the invention relates to improvements in apparatus which can be utilized with advantage as a means for operating friction clutches of the type utilized in power trains between engines or other prime movers, and variable-speed transmissions in motor vehicles.

A clutch of the type suitable to be operated by the apparatus of the present invention normally comprises operating means, such as a diaphragm spring, which changes its orientation and/or position during engagement and disengagement of the clutch. Conventional operating apparatus employ a carrier which is or which can be installed on the case of the transmission and mounts at least one support. The latter carries an actuator which is rotatable about and movable in the direction of the common axis of the pressure plate, counterpressure plate and housing of the clutch. The actuator serves to displace the operating means of the clutch by way of a bearing and the support prevents the bearing from leaving the position it assumes when the clutch is engaged. The means for moving the actuator relative to the support in the axial direction of the clutch includes a system of cams or ramps which cause the actuator to move axially of the clutch in response to rotation of the actuator relative to the support. Reference may be had, for example, to published French patent application No. A 2 658 763.

A drawback of presently known clutch operating apparatus, including that disclosed in the aforementioned published French patent application, is that they are rather complex (because they comprise a large number of parts), prone to malfunction and expensive. Furthermore, the assembly of the parts is a highly complex and time consuming operation.

Another drawback of heretofore known clutch operating apparatus is that, if the clutch is provided with a mechanism which is to compensate for wear upon the friction linings of the clutch disc and/or upon the friction surfaces of the pressure plate and counterpressure plate, the bearing or bearings of the operating apparatus are no longer capable of moving the operating means of the clutch to one and the same position relative the pressure plate and counterpressure plate as the wear upon the friction linings and certain other components of the clutch increases, i.e., in response to progressing axial shifting of the pressure plate toward the counterpressure plate and attendant change of orientation of the operating means of the clutch, such as the aforementioned clutch spring. The problem is particularly serious if the force-transmitting connection between the clutch pedal in a motor vehicle and the bearing of the clutch operating apparatus comprises a linkage or a bowden wire. The tolerances in the force transmitting connection are compounded by tolerances which develop in such connection as a result of progressing wear upon the friction linings of the clutch disc and the friction surfaces of neighboring parts. In other words, the play which develops between the clutch pedal and the bearing or bearings of the clutch operating apparatus due to progressing wear upon the friction linings is not compensated for by heretofore known clutch operating apparatus so that the clutch is not likely to be disengaged to the desired extent as soon as the wear upon the friction linings reaches a certain value. Thus, the distance which the bearing or bearings of the clutch operating apparatus should cover in response to repeated depression of the clutch pedal, in order to ensure that the positions of various parts of the clutch relative to each other do not change in response to repeated engagement and disengagement of the clutch, varies during the useful life of the clutch and the conventional operating apparatus therefor. In fact, the total play in the force-transmitting connection can rise to a value at which the aforementioned compensating mechanism is no longer capable of adequately compensating for wear upon the friction linings so that the engagement and/or disengagement of the friction clutch is no longer predictable. Thus, there exists an urgent need for clutch operating apparatus which are constructed and assembled in such a way that their operation is not affected by progressing wear upon certain components of the clutch and/or by progressing wear upon the constituents of the clutch operating apparatus.

OBJECTS OF THE INVENTION

An object of the invention is to provide a clutch operating apparatus whose operation is not affected by progressing wear upon the friction linings, the pressure and counterpressure plates and the clutch spring of a clutch, such as a friction clutch between the engine or another prime mover and the transmission of a motor vehicle.

Another object of the invention is to provide a simple and compact clutch operating apparatus which can be installed in motor vehicles or other machines in a simple and time-saving manner.

A further object of the invention is to provide an inexpensive clutch operating apparatus which comprises a relatively small number of simple parts.

An additional object of the invention is to provide an apparatus which can be utilized to operate heretofore known clutches, such as friction clutches for use in motor vehicles.

Still another object of the invention is to provide an apparatus which is capable of operating a clutch in a highly predictable manner during the entire useful life of the clutch.

A further object of the invention is to provide an apparatus which can be utilized with advantage to operate clutches of the type disclosed in commonly owned German patent applications Nos. P 42 39 291.8, P 42 39 689.6, P 42 43 667.6 and P 43 17 586.4 as well as in the corresponding United States patent applications. The disclosures of the aforementioned corresponding United States patent applications are incorporated herein by reference.

Another object of the invention is to provide a clutch operating apparatus which is constructed and assembled in such a way that it can maintain the operating means of a clutch in an optimum position during engagement as well as during disengagement of the clutch irrespective of the extent of wear upon the parts of the improved apparatus.

An additional object of the invention is to provide a clutch operating apparatus which ensures predictable and optimal positioning of those parts which must be displaced in order to change the condition of the clutch between a condition of engagement and a condition of disengagement.

Still another object of the invention is to provide a novel and improved method of assembling the improved clutch operating apparatus.

A further object of the invention is to provide novel and improved means for compensating for wear upon the constituents of the above-outlined clutch operating apparatus.

Another object of the invention is to provide a novel and improved power train between the clutch pedal of a motor vehicle and the bearing or bearings which must be moved in order to engage or disengage a friction clutch between the prime mover and the transmission of the vehicle.

An additional object of the invention is to provide a vehicle which embodies the above-outlined clutch operating apparatus.

SUMMARY OF THE INVENTION

The invention is embodied in an apparatus for operating a clutch (particularly a friction clutch in the power train between a prime mover, such as the engine of a motor vehicle, and a transmission) having operating means (e.g., a clutch spring, particularly a diaphragm spring) rotatable about a predetermined axis and movable in the direction of the axis between first and second positions in which the clutch is respectively engaged and disengaged. The operating means of the clutch is moved in the direction of the axis as a result of progressing wear upon at least one component of the clutch. The improved apparatus comprises: (1) a bearing (e.g., an antifriction bearing) including a rotary portion (e.g., one of the races of an antifriction bearing) which is movable in the direction of the axis to move the operating means from one to the other of the first and second positions, (2) a carrier (e.g., a hollow carrier mounted on the housing or case of the transmission in a motor vehicle), (3) at least one support mounted on the carrier, (4) an actuator mounted on the at least one support for rotation about the axis relative to the at least one support and for movement relative to the carrier in the direction of the axis to thus move the operating means of the clutch from one to the other of the first and second positions, (5) means for moving the actuator relative to the at least one support in the direction of the axis in response to rotation of the actuator relative to the at least one support, and (6) means for at least partially compensating for wear upon the at least one component of the clutch, including means for moving the bearing in the direction of the axis relative to the carrier. The compensating means can be installed between the carrier and the at least one support. The at least one support can be mounted in such a way that it is movable relative to the carrier in the direction of the axis.

The apparatus can further comprise means for nonrotatably securing the at least one support to the carrier.

The carrier can comprise a tubular portion and the at least one support can be constructed and mounted in such a way that it is movable relative to the tubular portion of the carrier in the direction of the axis. The at least one support can include a radially inner tubular portion. One of the two tubular portions is preferably surrounded by the other tubular portion and the tubular portion of the at least one support is preferably movable relative to the tubular portion of the carrier in the direction of the axis.

The at least one support can be disposed between the actuator and the compensating means.

The bearing can be mounted directly on the actuator and the means for moving the actuator relative to the at least one support can include at least one first cam (e.g., a ramp) on the actuator and at least one complementary second cam (e.g., a ramp) which is provided on the at least one support and cooperates with the at least one first cam to move the actuator relative to the at least one support in the direction of the axis in response to rotation of the actuator relative to the at least one support. The means for moving the actuator relative to the at least one support can further comprise rolling elements between the first and second cams.

In accordance with a presently preferred embodiment, the compensating means of the clutch operating apparatus comprises ramps. The ramps can slope in the direction of the axis; such ramps can include at least one first set of ramps and at least one second set of ramps complementary to the ramps of the first set. The ramps of the at least one first set are turnable about the axis relative to the ramps of the at least one second set. The ramps of the at least one second set can be non-rotatably secured to (e.g., they can form part of) the carrier.

The ramps of the at least one first set can be provided on a rotary annular member of the means for moving the bearing in the direction of the axis relative to the carrier, and such annular member can be mounted for rotary movement about the axis and relative to the carrier. Furthermore, the annular member can be mounted for movement relative to the carrier in the direction of the axis. The annular member can form part of a power train between the carrier and the at least one support, and the at least one support can be directly coupled to the annular member against movement in the direction of the axis.

The means for moving the actuator relative to the at least one support can be disposed at a first radial distance from the axis and the compensating means can be disposed at a lesser second radial distance from such axis. Furthermore, the bearing can be disposed at a first distance from the carrier (as seen in the direction of the axis) and the compensating means can be disposed at a second distance from the carrier; the second distance can equal or at least approximate the first distance.

The annular member of the means for moving the bearing in the direction of the axis relative to the carrier can be mounted in such a way that it at least partially surrounds a tubular portion of the at least one support.

The compensating means can include at least one first set of ramps and at least one second set of ramps which are complementary to the ramps of the at least one first set. The ramps of the at least one first set or the ramps of the at least one second set are turnable about the axis relative to the ramps of the at least one second set or the ramps of the at least one first set and each ramp of the at least one first set has a first surface abutting a second surface on one of the ramps of the at least one second set. The first surfaces and the respective second surfaces are in self-locking engagement with each other and are inclined relative to a plane which is normal to the axis. The first and/or second surfaces can be inclined relative to the aforementioned plane through angles of between about 3° and 15°, preferably between about 4° and 10°.

The ramps of the at least one first set or the at least one second set can be mounted for rotation about the axis relative to the complementary ramps of the at least one second set or the at least one first set, and each ramp can be mounted in such a way that it can slide relative to the complementary ramp. The compensating means embodying such ramps can further include resilient means for urging the at least one second set of ramps or the at least one first set of ramps in a direction to compensate for wear upon the at least one component of the clutch. The resilient means can comprise at least one coil spring surrounding at least a portion of the aforementioned annular member forming part of the means for moving the bearing in the direction of the axis relative to the carrier.

The ramps of the at least one first set or the ramps of the at least one second set can form part of a power train between the ramps of the at least one second set or the ramps of the at least one first set and the bearing, and the resilient means is mounted and designed in such a way that it is operative to move the ramps of the at least one first set or the ramps of the at least one second set in the direction of the axis in order to move the operating means of the clutch in the direction of the axis by way of the bearing; this causes the bearing to move relative to the carrier in the direction of the axis to compensate for wear upon the at least one component of the clutch.

The annular member of the means for moving the bearing in the direction of the axis relative to the carrier can be mounted for rotation relative to the at least one support about the axis, and the compensating means employing such annular member can further comprise means for limiting the extent of rotation of the annular member relative to the at least one support.

The bearing can be installed in such a way that it is movable relative to the carrier in the direction of the axis through a first distance to thereby move the operating means of the clutch between the first and second positions, and the annular member of the means for moving the bearing in the direction of the axis relative to the carrier is then movable in the direction of the axis through a second distance which matches or at least approximates the first distance. The means for moving the actuator relative to the at least one support can include at least one first cam (e.g., a ramp) which is provided on the carrier or on the at least one support and at least one complementary second cam (e.g., a ramp) which is movable relative to the at least one first cam to thereby move the actuator and the bearing in response to rotation of the actuator relative to the at least one first cam.

The at least one first cam can be provided on the at least one support and the at least one second cam can be provided on the annular member to move the annular member and the bearing in the direction of the axis relative to the at least one support in response to rotation of the annular member relative to the at least one support, and the cams can include or can carry means for limiting the extent of rotation of the annular member relative to the at least one support. The compensating means of such apparatus can further comprise at least one rolling element between the first and second cams, and the limiting means can comprise stops for the at least one rolling element; such stops can be provided at the end portions of the cams.

The apparatus can further comprise means for limiting the extent of movability of the bearing in the direction of the axis relative to the carrier. Such means for limiting can include means for limiting the extent of rotation of the annular member of the means for moving the bearing in the direction of the axis relative to the at least one support or relative to the carrier.

The apparatus can be constructed in such a way that the at least one support is movable relative to the carrier in the direction of the axis, and such apparatus can further comprise means for limiting the extent of movability of the at least one support relative to the carrier. Such means for limiting can comprise complementary detents provided on the at least one support and on the carrier, and the detents can be designed in such a way that they are engageable with each other by snap action.

The apparatus can also comprise means for temporarily maintaining the bearing in a position corresponding to the first position of the operating means prior to initial movement of the operating means to the second position. Such means for maintaining can include means for holding the means for moving the bearing in a position which the bearing assumes in the absence of wear upon the at least one component of the clutch. The means for maintaining can be installed between the carrier and the annular member of the means for moving the bearing relative to the carrier.

The apparatus can also comprise means for blocking the movement of the bearing by the moving means in a direction to compensate for wear upon the at least one component of the clutch prior to initial disengagement of the clutch.

A clutch which is to be operated by the apparatus of the present invention can be constructed and assembled in such a way that it comprises a counterpressure plate which is rotatable about the axis, a pressure plate which has only limited freedom of axial movement relative to the counterpressure plate, operating means including at least one clutch spring (such as a diaphragm spring) which biases the pressure plate against a rotary clutch disc between the two plates in the engaged condition of the clutch, and friction linings constituting or forming part of the at least one component and being mounted on the clutch disc to be clamped between the friction surfaces of the pressure plate and the counterpressure plate in the engaged condition of the clutch. The pressure plate moves nearer to the counterpressure plate in response to progressing wear upon the friction surfaces of the two plates and/or upon the friction linings on the clutch disc, and the at least one clutch spring includes a portion (such portion can include a set of radially extending prongs or tongues forming part of a diaphragm spring) which is engaged by the bearing in the disengaged condition of the clutch. The apparatus for operating such clutch can further comprise means for displacing the clutch spring in the direction of the axis in response to progressing wear upon the friction surfaces and/or upon the friction linings so that the bias of the at least one clutch spring upon the pressure plate in the engaged condition of the clutch remains at least substantially unchanged regardless of the extent of wear upon the friction surfaces and/or upon the friction linings.

A clutch of the above-outlined character can further comprise a housing which is rotatable with the counterpressure plate and the pressure plate, and a seat (e.g., a composite seat) provided on the housing to tiltably mount the at least one clutch spring. The latter then acts not unlike a two-armed lever having a first arm disposed radially inwardly or radially outwardly of the seat and engaging the pressure plate in the engaged condition of the clutch, and a second arm which is located radially outwardly or radially inwardly of the seat and is engaged by the bearing, at least in the disengaged condition of the clutch. The displacing means of the apparatus for operating such clutch can include means for biasing the at least one clutch spring against the seat, and the means for moving the bearing in the direction of the axis can include the aforementioned annular member which serves to bias the operating means with a force increasing in response to progressing wear upon the friction linings to thus overcome the force of the biasing means. The compensating means of such apparatus can further comprise means for moving the annular member in the direction of the axis toward the counterpressure plate to an extent which suffices to at least compensate for the extent of movement of the pressure plate nearer to the counterpressure plate as a result of wear upon the friction surfaces of the two plates and/or upon the friction linings of the clutch disc.

The clutch which can be operated by the improved apparatus can include a counterpressure plate which is a composite flywheel including a first flywheel rotatable about the axis and adapted to be driven by the output element of a prime mover (such as a combustion engine in a motor vehicle), a second flywheel rotatable relative to and with the first flywheel and having a friction surface engageable by the friction linings of the clutch disc, and at least one damper which yieldably opposes rotation of the first and second flywheels relative to each other. The means for moving the actuator of the apparatus for operating such clutch can include means for shifting the actuator relative to the counterpressure plate in response to wear upon the friction surfaces of the two plates and/or upon the friction linings.

BRIEF DESCRIPTION OF THE DRAWINGS

The novel features which are considered as characteristic of the invention are set forth in particular in the appended claims. The improved clutch operating apparatus itself, however, both as to its construction, its mode of operation and the method of assembling the same, together with additional features and advantages thereof, will be best understood upon perusal of the following detailed description of certain presently preferred specific embodiments with reference to the accompanying drawings, wherein:

FIG. 1a is an enlarged fragmentary sectional view substantially as seen in the direction of arrows from the line II—II in FIG. 1;

FIG. 3 is an enlarged view of a detail of the clutch operating apparatus which is shown in FIG. 1;

FIG. 7 is an enlarged developed view of a portion of the carrier, substantially as seen in the direction of arrow VII in FIG. 6;

FIG. 8 is an enlarged axial sectional view of a portion of a second clutch operating apparatus;

FIG. 9 is a fragmentary partly elevational and partly sectional view of a connection between the clutch operating apparatus and the means for actuating the apparatus;

FIG. 10a is a fragmentary sectional view of two complementary ramps forming part of the wear compensating means in the clutch operating apparatus of the present invention;

FIG. 10b is a similar fragmentary sectional view of two modified complementary ramps;

FIG. 11 illustrates certain parts of a connection constituting a modification of the connection which is shown in FIG. 9;

FIG. 12 is a fragmentary axial sectional view of a further clutch operating apparatus; and FIG. 13 is a fragmentary axial sectional view of still another clutch operating apparatus.

DESCRIPTION OF PREFERRED EMBODIMENTS

Figure 1:
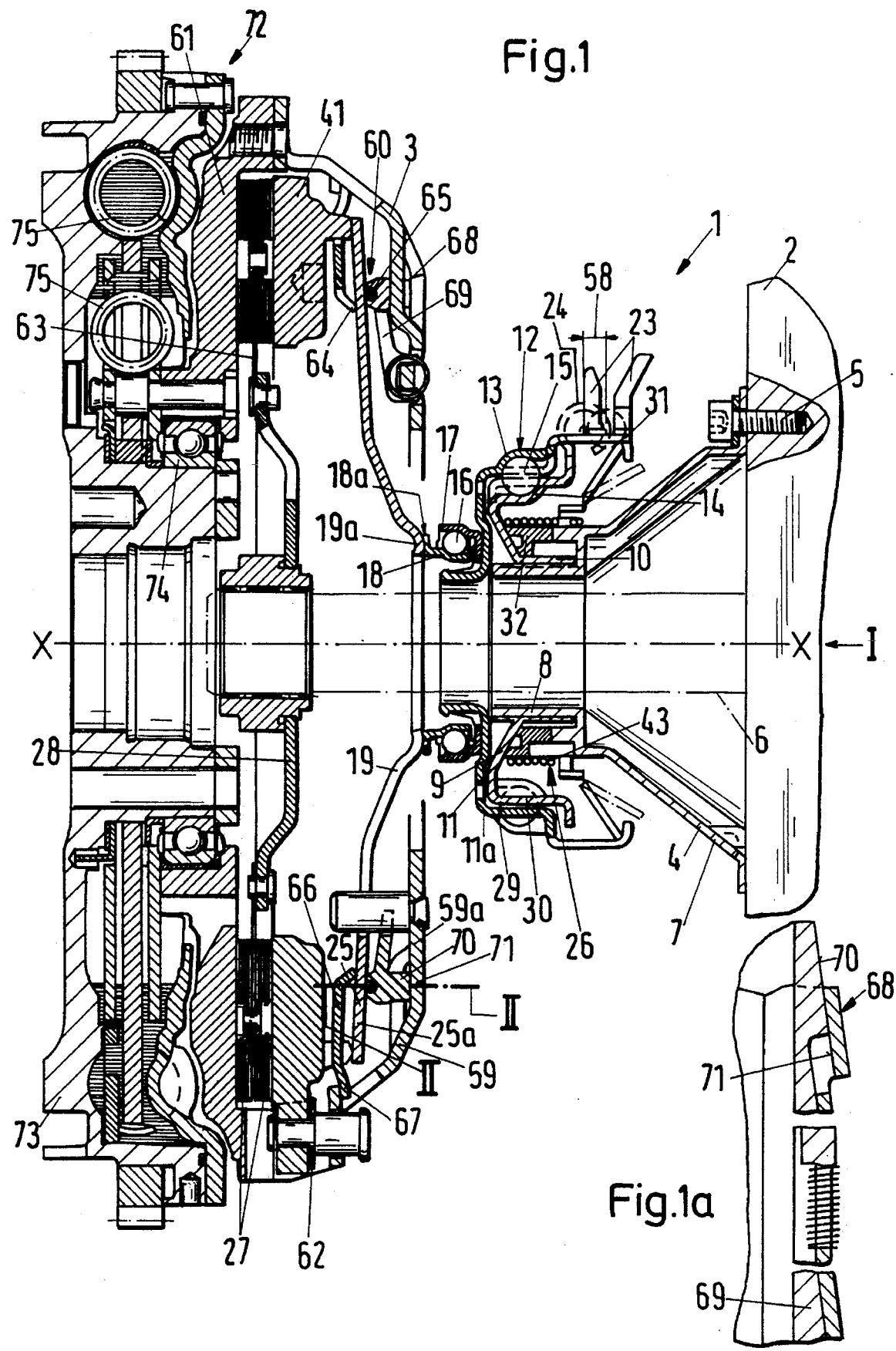
FIG. 1 is an axial sectional view of a friction clutch and of a clutch operating apparatus which embodies one form of the present invention.
Figure 2:
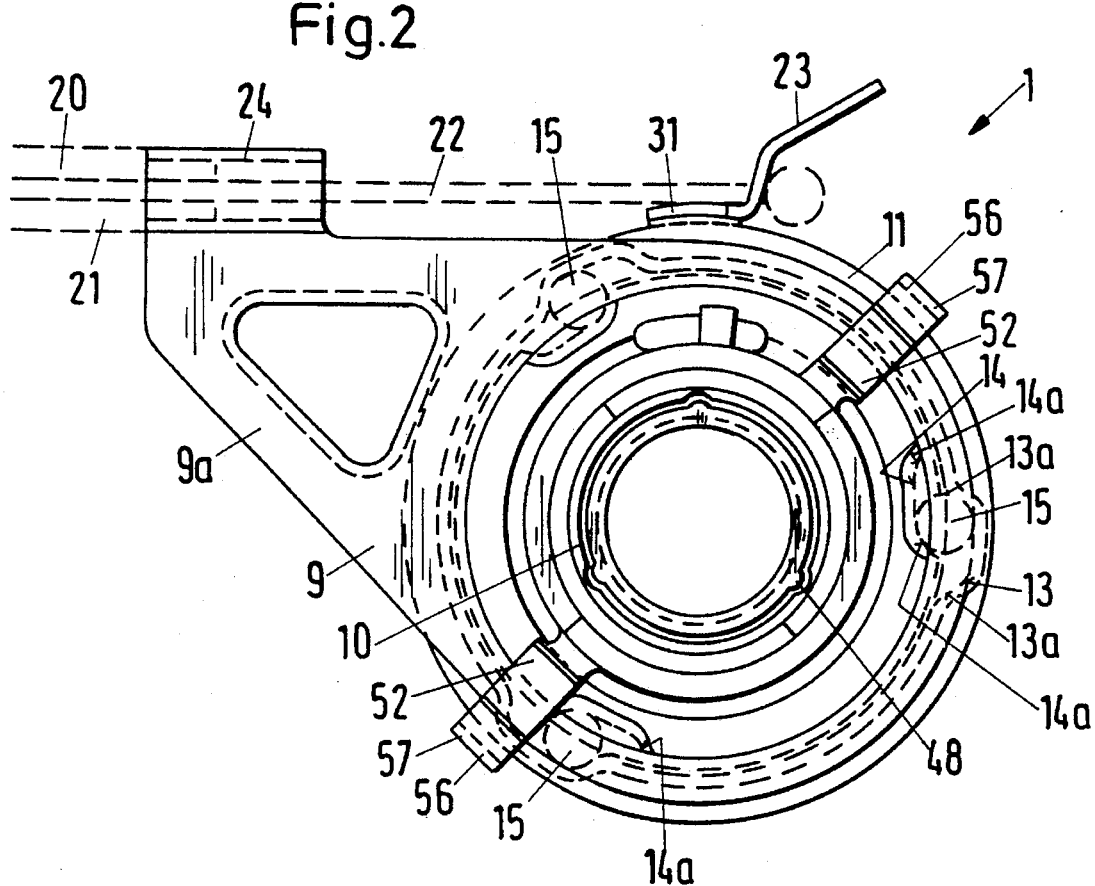
FIG. 2 is an end elevational view of the apparatus substantially as seen in the direction of arrow 1 in FIG. 1.

FIGS. 1, 2 and 3 show the details of a novel and improved apparatus 1 which is constructed and assembled to operate a friction clutch 3. The common axis of the apparatus 1 and clutch 3 is shown at X—X, and the apparatus 1 is installed between the housing or case of a variable speed transmission 2 and the clutch 3, as seen in the direction of the axis X—X. The clutch 3 includes a composite flywheel 72 including a first flywheel 73 connectable to the output element (e.g., a camshaft or a crankshaft) of a combustion engine or another prime mover in a motor vehicle), a second flywheel 61 which is rotatable with as well as relative to the first flywheel 73, and one or more dampers 75 disposed between the flywheels 73, 61 and serving to yieldably oppose rotation of the two flywheels relative to each other. The clutch 3 which is shown in FIGS. 1 to 3 can be of the type disclosed, for example, in commonly owned U.S. Pat. No. 5,180,335 granted Jan. 19, 1993 to Maucher et al. for "Torsion damping assembly for use with clutches in motor vehicles". The patent shows a prime mover, a connection between the output element of the prime mover and the first flywheel of a composite flywheel, a transmission, and a connection between another flywheel of the composite flywheel and the input element of the transmission. The disclosure of the patent to Maucher et al. is incorporated herein by reference.

The clutch operating apparatus 1 comprises a carrier 4 which, in the embodiment of FIGS. 1 to 3, is fixedly connected to the case of the transmission 2 by bolts 5 or other suitable fasteners. The illustrated carrier 4 is made of a suitable plastic material, e.g., in an injection molding or other suitable machine, and includes a hollow frustoconical portion 7 adjacent the case of the transmission 2 and a tubular portion 8 which is coaxial with the portion 7 and extends from the smaller-diameter end of the portion 7 toward the composite flywheel 72. The carrier 4 spacedly surrounds the input shaft 6 of the transmission 2. The tubular portion 8 of the carrier 4 mounts a support 9 which serves to take up the forces necessary to disengage the clutch 3 and to transmit such forces to the carrier 4, i.e., to the case of the transmission 2. The radially inner portion 10 of the support 9 is a tube which surrounds and is movable axially of, as well as rotatable about, the axis X—X relative to the tubular portion 8 of the carrier 4.

The apparatus 1 further comprises an annular actuator 11 which, in the embodiment of FIGS. 1 to 3, is made of a metallic sheet material and is mounted for axial movement relative to, as well as for rotation with respect to, the support 9. The means (12) for moving the actuator 11 relative to the support 9 in the direction of the axis X—X comprises a first set of cams or ramps (hereinafter called cams) 13 on the actuator 11 and a second set of complementary cams or ramps (hereinafter called cams) 14 on the support 9. The moving means 12 further comprises rolling elements (e.g., spheres) 15 which are disposed between the cams 13 and the respective (complementary) cams 14. The cams 13, 14 extend in the circumferential direction of the annular actuator 11 and their confronting surfaces slope in the direction of the axis X—X from the carrier 4 toward the friction clutch 3. In the apparatus 1 of FIGS. 1 to 3, the cams 13 are of one piece with the actuator 11 and the cams 14 are of one piece with the support 9. The cams 13 can constitute suitably deformed portions of the actuator 11, and the cams 14 can constitute suitably deformed portions of the support 9. The actuator 11 is made of metallic sheet material, the same as the support 9, and the cams 13, 14 can be obtained by upsetting or otherwise displacing certain portions of the parts 11 and 9, respectively. However, it is equally possible to employ two separately produced ring-shaped members one of which is provided with the ramps 13 and the other of which is provided with the ramps 14. The one member is welded or otherwise affixed to the actuator 11, and the other member is welded or otherwise affixed to the support 9.

The actuator 11 carries an antifriction ball bearing 16 which serves to actually disengage the clutch 3 by moving the operating means of the clutch in a direction to the left, as viewed in FIG. 1. The operating means includes the tips 19a of radially inwardly extending prongs 19 forming part of the clutch spring 25 here shown as a diaphragm spring acting not unlike a two-armed lever. FIG. 1 shows the operating means 19a in a first end position (as seen in the direction of the axis X—X) in which the clutch 3 is engaged. The bearing 16 can move the operating means 19a in a direction to the left, as viewed in FIG. 1, to a second end position in which the clutch 3 is disengaged because its clutch plate or clutch disc 28 is no longer clamped between the friction surface of the flywheel 61 and the friction surface of a pressure plate 41 having limited freedom of axial movement relative to but sharing all angular movements of the counterpressure plate constituted by the composite flywheel 72 of the clutch.

The bearing 16 has limited freedom of axial movement relative to the actuator 11. In order to effect a relative axial movement between the bearing 16 and the actuator 11, it is necessary to overcome friction between the actuator and the outer race 17 of the bearing. The inner race 18 of the bearing 16 can rotate with the clutch spring 25 because it includes a radially outwardly extending collar-shaped end portion 18a which bears against the operating means 19a. The connection between the outer race 17 and the actuator 11 is a force-locking connection which can be deactivated in response to the application of a predetermined force.

FIG. 2 shows that the actuator 11 can change its angular position in response to a pull exerted by a flexible coupling 20 including a bowden wire or cord 22. The sheath 21 of the flexible coupling 20 has an end portion in contact with a triangular abutment 9a of the support 9. The wire 22 extends beyond the end portion of the sheath 21 and includes a hooked or otherwise configured free end portion engaging a motion receiving arm 23 of the actuator 11. The non-illustrated end portion of the wire 22 is connected to the clutch pedal (not shown) of the motor vehicle embodying the clutch operating apparatus 1 of FIGS. 1 to 3. The triangular abutment 9a of the support 9 is provided with a tubular guide 24 which serves as a stop for the adjacent end portion of the sheath 21 and establishes a path for the wire 22 so that the free end portion of the wire 22 can be separably or non-separably secured to the motion receiving arm 23 of the actuator 11. The illustrated arm 23 is a separately produced part including a portion 31 which is welded or otherwise affixed to the actuator 11.

The end portion 18a of the inner race 18 of the bearing 16 can constitute a circumferentially complete collar or it can be constituted by a set of radially outwardly extending tongues which cooperate with the operating means 19a of the prongs 19 forming part of the clutch spring 25 to disengage the clutch 3 by tilting the spring 25 relative to a seat assembly 60 at the inner side of the bottom wall or end wall forming part of the cover or housing 59 of the friction clutch 3.

In accordance with a feature of the invention, the apparatus 1 further comprises a unit 26 which serves to compensate for progressing wear upon at least one component of the clutch 3, namely the friction linings 27 disposed at both sides of resilient segments 63 forming part of the clutch disc 28. In addition to compensating for wear upon the friction linings 27, the unit 26 can also compensate for wear upon the friction surface of the flywheel 61 and/or the friction surface of the pressure plate 41 and/or the clutch spring 25. As a result of wear at least upon the friction linings 27 of the clutch disc 28, the operating means 19a of the clutch 3 move in a direction toward the composite flywheel 72, i.e., in the direction of the axis X—X and away from the carrier 4 on the case of the transmission 2. The unit 26 ensures that the cams 13, 14 can move the bearing 16 axially of the clutch 3 in a direction toward the composite flywheel 72 through the same distance irrespective of the wear upon the friction linings 27. Otherwise stated, the end portion 18a of the inner race 18 of the bearing 16 is always maintained in an optimum position relative to the operating means 19a regardless of the wear upon the friction linings 27 so that the axial distance covered by the actuator 11 and the bearing 16 in response to depression of the clutch pedal (for the purpose of disengaging the clutch 3) remains at least substantially constant during the entire useful life of the clutch 3 and clutch operating apparatus 1. In other words, the moving means 12 need not change the extent of axial movement of the actuator 11 relative to the support 9 in order to disengage the clutch 3 even if the friction surfaces of the flywheel 61 and pressure plate 41, the clutch spring 25 and/or the friction linings 27 have undergone extensive wear which progresses with the useful life span of the clutch 3. As a rule, progressing wear upon the friction linings 27 is the primary cause of axial shifting of the operating means 19a in the direction of the axis X—X and away from the carrier 4 of the clutch operating apparatus 1.

As can be seen in FIG. 1, the support 9 and the actuator 11 are interfitted in the direction of the axis X—X. To this end, the actuator 11 comprises a substantially cupped portion 11a for the support 9. The latter has a substantially U-shaped cross-sectional outline. The leftmost portion of the support 9 is adjacent the radially extending part of the cupped portion 11 (as seen in the direction of the axis X—X). The cams 13 of the moving means 12 are provided on the radially outermost portion 29 of the actuator 11, and the cams 14 of the moving means 12 are provided on or at the radially outermost portion 30 of the support 9. The motion receiving portion or portions 23 of the actuator 11 are provided on the axially extending radially outermost portion 29. The aforementioned arm or arms 31 of the motion receiving portion or portions 23 can be of one piece with the radially outermost portion 29 of the actuator 11.

The aforementioned flexible coupling 20 including the bowden wire 22 and the sheath 21 is but one of several types of couplings which can transmit motion between a clutch pedal and the actuator 11. For example, the coupling 20 can be replaced by an electric, hydraulic or pneumatic servomotor (not shown) or any other suitable means for changing the angular position of the actuator 11 so that the latter is moved relative to the support 9 in the direction of the axis X—X and away from the carrier 4. If a servomotor is employed, it is preferably installed close to or even in the immediate proximity of the actuator 11, for example, on or at least close to the triangular portion 9a of the support 9.

The compensating unit 26 is installed in the power train between the carrier 4 and the end portion 18a of the inner race 18 of the bearing 16 and is disposed radially inwardly of the moving means 12 including the cams 13 and 14. More specifically, the illustrated compensating unit 26 is installed in the annular space between the tubular radially inner portion 10 and the radially outer portion 30 of the support 9. The unit 26 includes means for moving the bearing 16 in the direction of the axis X—X and away from the carrier 4, and such moving means includes an annular member 32 (see particularly FIGS. 3, 4 and 5). The annular member 32 is provided with two ring-shaped sets of ramps 33 and 34 with the ramps 34 forming a ring which surrounds the ring formed by the ramps 33 (see particularly FIG. 4). The ramps 33 and 34 have elongated arcuate surfaces which slope in the direction of the axis X—X. The ramps 33 are offset relative to the ramps 34 in the circumferential direction of the annular member 32, for example, to such an extent that one half of each ramp 33 is disposed at one side and the other half of each ramp 33 is disposed at the other side of the highest point of the sloping surface of the respective ramp 34 and vice versa. This can be seen in FIG. 5.

The annular member 32 which is shown in FIGS. 1, 3, 4 and 5 includes two ramps 33 and two ramps 34. In other words, each of these ramps extends along an arc of 180°. However, it is equally within the purview of the invention to provide the annular member with three or more ramps 33 and/or 34. The slope of the elongated surfaces of the ramps 33 and 34 increases with the number of such ramps.

The ramps 33, 34 are provided at one side or end face of the annular member 32 and the other side or end face 35 of the member 32 is in direct contact with the adjacent portion of the support 9 (see particularly FIG. 3). The surface or end face 35 constitutes a frustum of a cone and abuts a complementary frustoconical surface 36 provided on the support 9 in the region of the extension 9a. The frustoconical surfaces 35, 36 cooperate to center the annular member 32 on the support 9. The annular member 32 surrounds the tubular portion 10 of the support 9 which is centered by the carrier 4.

The ramps 33, 34 of the annular member 32 extend in the direction of the axis X—X and away from the bearing 16. The member 32 is biased in a direction to turn about the axis X—X, namely in a direction such that it is caused to move in the direction of the axis X—X and away from the carrier 4. To this end, the ramps 33, 34 respectively cooperate with complementary ramps 37 and 38 (see particularly FIGS. 3, 6 and 7) on the adjacent end face of the stationary carrier 4. Thus, when the annular member 32 of the compensating unit 26 is free to turn about the axis X—X, it is caused to move axially and away from the carrier 4, i.e., toward the friction clutch 3.

Figure 5:
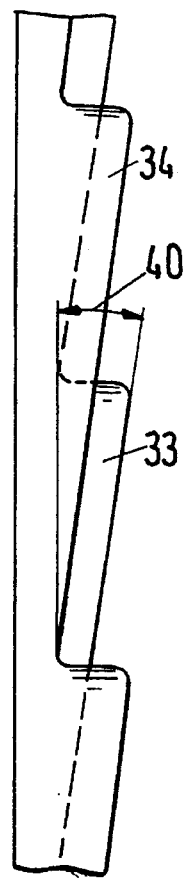
FIG. 5 is an enlarged developed view of a portion of the annular member, substantially as seen in the direction of arrow V in FIG. 4.
Figure 6:
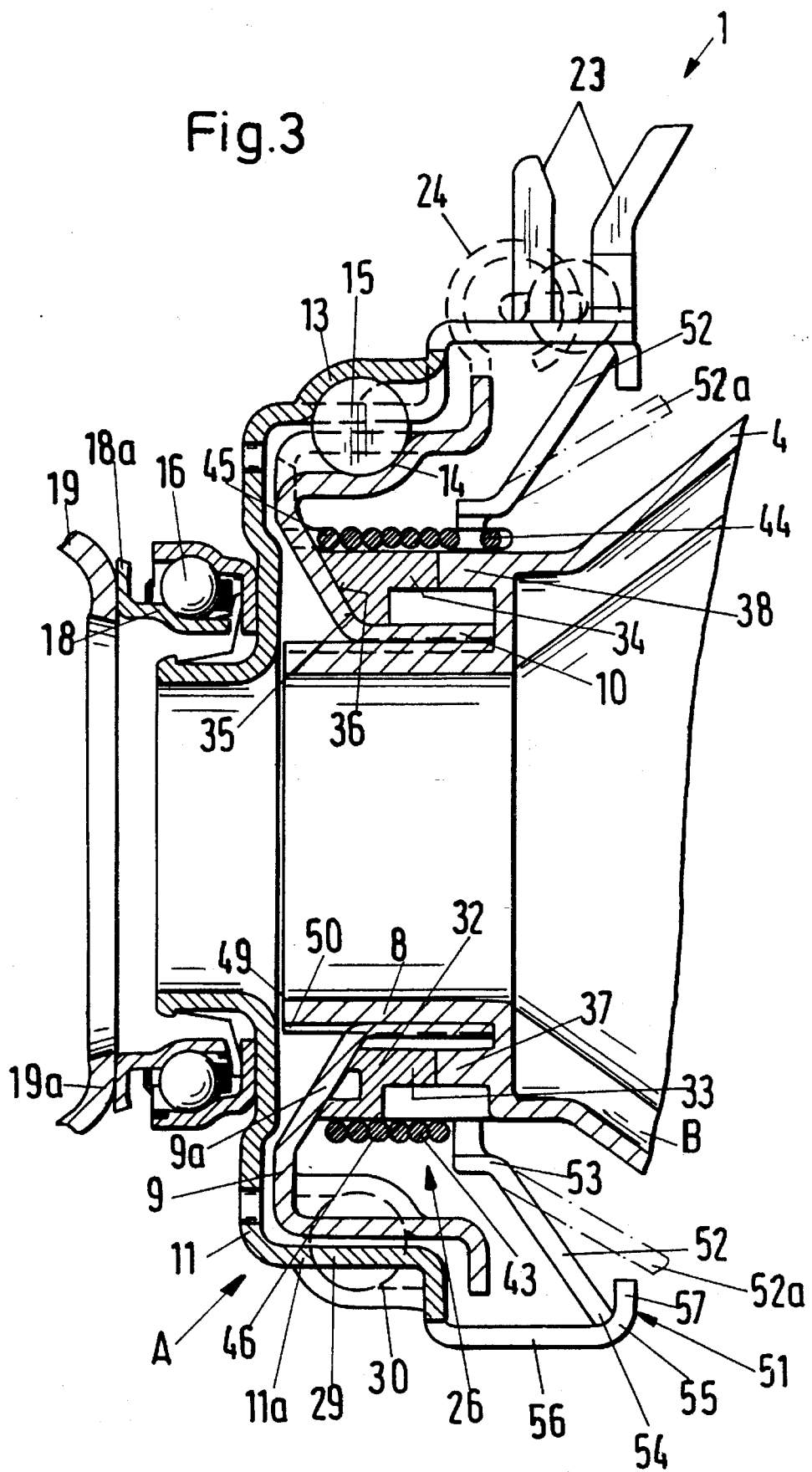
FIG. 6 is an enlarged end elevational view of the carrier in the apparatus of FIGS. 1 to 3.

FIG. 6 shows that the ramps 38 which are complementary to and cooperate with the ramps 34 of the annular member 32 surround the ramps 37 which are complementary to and cooperate with the ramps 33 in response to rotation of the annular member 32 in such a direction that the member 32 is caused to move axially and away from the carrier 4. The ramps 37 are angularly offset relative to the ramps 38, the same as the aforediscussed ramps 33, 34 of the annular member 32. The ramps 37 form a set of two arcuate ramps, and the ramps 38 also form a set of two arcuate ramps extending in the circumferential direction of the end portion of the carrier 4. The arcuate surfaces of the ramps 33 and 34 respectively slide along the arcuate surfaces of the ramps 37, 38 in response to rotation of the annular member 32 to thus cause the member 32 to move toward the clutch 3 when it is caused to turn about the axis X—X. The arcuate surfaces of the ramps 33, 34 and of the complementary ramps 37, 38 further serve as a means for accurately centering the member 32 relative to the carrier 4. The acute angles 40 between the sloping surfaces of the ramps 33, 34 on the annular member 32 and a plane which is normal to the axis X—X (see FIG. 5) match or at least closely approximate the angles 39 (FIG. 7) between the sloping surfaces of the ramps 37, 38 of the carrier 4 and a plane which is normal to the axis X—X.

The annular member 32 can be made of a plastic material, the same as the carrier 4. Such material (e.g., a thermoplastic substance) is preferably resistant to heat and can be reinforced by filaments of carbon or other suitable material. This renders it possible to mass produce the annular member 32 in a suitable injection molding or other plastic processing machine, the same as the carrier 4.

The ramps 37 and 38 can be formed or otherwise provided on an annular part (not specifically shown) which is produced in a separate step and is thereupon bonded or otherwise affixed to the end portion of the carrier 4 adjacent the ramps 33, 34 of the annular member 32. The annular part can be a tight fit on the tubular portion 8 of the carrier 4 and can be additionally secured to the carrier so that it cannot turn with the annular member 32 when the latter is free to follow the spring bias and to turn about the common axis X—X of the friction clutch 3 and the clutch operating apparatus 1.

The slopes of the arcuate surfaces of the ramps 33, 34 and 37, 38 and the lengths of such arcuate surfaces are selected with a view to ensure that the annular member 32 can turn relative to the carrier 4 through an angle which is sufficient to compensate for wear upon the friction surface of the flywheel 61 of the counterpressure plate constituted by the composite flywheel 72, upon the friction surface of the pressure plate 41 and/or upon the friction linings 27 during the entire useful life of the clutch 3. Furthermore, the slopes and the dimensions of the ramps 33, 34 and 37, 38 are or can be selected with a view to at least partially compensate for axial tolerances as a result of the making of the carrier 4 and/or the annular member 32 as well as for at least some tolerances which develop during assembly of the clutch operating apparatus 1. It is preferred to select the orientation and/or the dimensions of the ramps 33, 34 and 37, 38 with a view to compensate for all anticipated tolerances of those constituents of the apparatus 1 which include the carrier 4, the end portion 18a of the inner race 18 of the antifriction bearing 16 and the parts between the carrier 4 and the end portion 18a. It has been found that, if the friction clutch 3 is installed in a passenger car, the ramps 33, 34 and 37, 38 can compensate for wear upon the friction surface of the flywheel 61, upon the friction surface of the pressure plate 41, upon the friction linings 27 as well as for all machining and other tolerances (e.g., those developing during assembly of the apparatus 1) if the annular member 32 can turn relative to the carrier 4 through an angle which results in axial movement of the member 32 in a direction toward the friction clutch 3 through a distance of between about 4 mm and 12 mm. As a rule, or at least in many instances, only a fraction of such distance (normally between 1.3 mm and 2.5 mm) is necessary to compensate for wear upon the flywheel 61 and pressure plate 41 and/or the friction linings 27. Depending upon the number of cams 33, 34 and 37, 38, the angle through which the annular member 32 must be turned relative to the carrier 4 in order to achieve the aforementioned distances can be in the range of between about 30° and 170°. The angles 39 (FIG. 7) and 40 (FIG. 5) can be in the range of between 3° and 15°, preferably between about 5° and 9°. The angle 39 can vary in the radial direction of the carrier 4, and the angle 40 can vary in the radial direction of the annular member 32; this ensures that each increment of angular movement of the ramps 33, 34 on the annular member 32 relative to the ramps 37, 38 of the carrier 4 results in identical axial displacements of the member 32 in the direction of the axis X—X and toward the clutch 3 within the entire range of axial mobility of the member 32 with reference to the carrier 4. This necessitates a gradual reduction of the angle 39 in a direction from the axis X—X toward the periphery of that portion of the carrier 4 which supports the ramps 37, 38 and a gradual reduction of the angle 40 in a direction from the axis X—X toward the periphery of the annular member 32.

The means for biasing the annular member 32 in a direction to cause the ramps 33, 34 to slide relative to the respective complementary ramps 37, 38 includes at least one resilient element. FIGS. 1 and 3 show a coil spring 43 having convolutions surrounding the annular member 32 and being installed in stressed condition so that they always tend to turn the member 32 relative to the carrier 4 for the purpose of moving the member 32 in the direction of the axis X—X and toward the friction clutch 3. To this end, the spring 43 reacts against the support 9 and bears upon the member 32. As can be seen in FIG. 3, the right-hand end convolution 44 of the coil spring 43 is affixed to the annular member 32 and the left-hand end convolution 45 of the spring 43 is non-rotatably connected to the support 9. The intermediate convolutions 46 between the end convolutions 44 and 45 of the coil spring are stressed so that, when the annular member 32 is free to turn relative to the carrier 4, they cause the member 32 to change its angular position so that the ramps 33, 34 slide along the adjacent ramps 37, 38 and cause the annular member 32 and the support 9 to move away from the transmission 2. The support 9 is movable axially of but cannot turn relative to the carrier 4. The movements of the annular member 32 in a direction away from the transmission 2 are shared by the support 9, by the actuator 11, by the rolling elements 15 and by the bearing 16. These parts can be said to form part of a module A which is movable axially of the friction clutch 3 relative to a fixed module B including the carrier 4. Axial mobility of the module A ensures that the end portion 18a of the inner race 18 of the bearing 16 abuts the clutch operating means including the tips 19a of the prongs 19 forming part of the clutch spring 25. The end portion 18a bears upon the tips 19a with a predetermined force which ensures the establishment of a desirable bearing stress, e.g., a stress in the range of between approximately 10N and 70N.

The compensating unit 26 exhibits the additional advantage that it does not turn about the axis X—X, i.e., the operation of its constituents is not affected by centrifugal force when the housing 59, the flywheel 61, the pressure plate 41 and the clutch spring 25 are rotated relative to the carrier 4 and support 9.

FIGS. 2 and 6 show that the peripheral surface of the tubular portion 8 of the carrier 4 is provided with axially parallel projections 47 which are received in axially parallel internal recesses or grooves 48 of the tubular portion 10 forming part of the support 9. The projections 47 and the grooves 48 constitute male and female detents which confine the support 9 to axial movements relative to the carrier 4.

The free end 49 (FIG. 3) of the tubular portion 8 of the carrier 4 can be configured in such a way that it defines at least two but preferably more protuberances or similar formations 50 which must be displaced when the tubular portion 10 of the support 9 is slipped onto the tubular portion 8. In other words, the carrier 4 and the support 9 can be assembled in response to the application of a certain force which should suffice to displace the protuberances 50 so that the tubular portion 10 can be moved toward the frustoconical portion 7 of the carrier 4. This ensures that, once the tubular portion 10 is slipped onto the tubular portion 8, the support 9 cannot be accidentally separated from the carrier 4. At least the tubular portion 8 of the carrier 4 preferably exhibits at least some elasticity which must suffice to permit forcible assembly of the tubular portions 8 and 10 in a manner as shown in FIGS. 1 and 3, i.e., in such a way that the tubular portion 10 surrounds the tubular portion 8 and is located to the right of the protuberances 50.

Due to the provision of the wear compensating unit 26, the moving means 12 including the cams 13, 14 and the rolling elements 15 is called upon only in order to disengage the clutch 3, i.e., to ensure that the friction linings 27 of the clutch disc 28 are no longer clamped between the friction surfaces of the flywheel 61 and the pressure plate 41 so that the composite flywheel 72 can turn relative to the clutch disc 28 and the input shaft 6 forming part of the transmission 2 and being non-rotatably coupled to the hub of the clutch disc 28. In other words, the moving means 12 is called upon to move the bearing 16 and hence the operating means 19a of the clutch 3 only through a distance which is necessary to tilt the clutch spring 25 relative to the seat assembly 60 so that the circumferentially complete radially outer portion 25a of the clutch spring 25 is moved toward the inner side of the bottom wall of the housing or cover 59 of the clutch 3. This enables the customary leaf springs 62 to move the pressure plate 41 axially and away from the flywheel 61. The leaf springs 62 couple the pressure plate 41 to the housing 59 and tend to move the pressure plate 41 axially and away from the flywheel 61.

The apparatus 1 further comprises means for limiting the extent of movability of the actuator 11 and bearing 16 in the direction of the axis X—X in order to disengage the clutch 3. The limiting means includes stops 13a, 14a (FIG. 2) on the end portions of the sloping surfaces of the ramps 13 and 14; such stops are engaged by the respective rolling elements 15 in response to a predetermined angular displacement of the actuator 11 and bearing 16 relative to the support 9. Once the rolling elements 15 are confined by the respective pairs of stops 13a and 14a, the actuator 11 cannot continue to turn relative to the support 9 in a direction to cause the cams 13 and 14 to continue to move the bearing 16 axially and away from the carrier 4. FIG. 2 shows the actuator 11 in the fully retracted position in which the clutch 3 is disengaged and the rolling elements 15 cooperate with the corresponding stops 13a, 14a to prevent an additional axial movement of the bearing 16 in a direction away from the composite flywheel 72. The rolling elements 15 then cooperate with the respective stops 13a, 14a to establish a form-locking connection between the actuator 11 and the support 9. Such form-locking connection is established when the actuator 11 assumes the end position which is shown in FIG. 2 (the clutch 3 is then disengaged) as well as when the actuator 11 assumes its fully retracted position in which the clutch 3 is engaged because the clutch spring 25 is free to bias the pressure plate 41 against the friction linings 27 so that the friction linings are clamped between the friction surfaces of the pressure plate 41 and the flywheel 61.

The rolling elements 15 are confined between the neighboring stops 13a, 14a in the engaged as well as in the disengaged condition of the friction clutch 3.

The cams 13, 14 of the moving means 12 are preferably provided on the actuator 11 and the support 9 in such a way that the parts 9, 11 are coupled to each other upon completion of axial movement of the actuator 11 relative to the support 9 to the position which is shown in FIG. 1 or 3. To this end, the sloping surfaces of the cams 13 and 14 can be provided with slight undercuts for the rolling elements 15 and the rolling elements enter such undercuts upon completion of their introduction between the neighboring cams 13 and 14. Insertion of the rolling elements 15 between the sloping surfaces of the respective cams 13, 14 preferably necessitates minor elastic deformation of the support 9 and/or actuator 11. The rolling elements 15 are inserted between the respective cams 13, 14 by moving in or close to the direction of the axis X—X. The necessary elastic deformation of the support 9 and/or actuator 11 will take place as a result of the application of a certain axially oriented force during slipping of the actuator 11 onto the support 9 until the actuator assumes the axial position which is shown in FIG. 3.

The compensating unit 26 is preferably provided with means for limiting the extent of axial movability of the support 9 relative to the carrier 4. Such limiting means can be provided between the annular member 32 and the carrier 4 and can comprise stops which limit the extent to which the member 32 can turn relative to the carrier 4.

When the friction clutch 3 is new, i.e., when the wear upon the friction surfaces of the flywheel 61 and of the pressure plate 41 and/or upon the friction linings 27 of the clutch disc 28 is nil or negligible, the ramps 33, 34 engage the complementary ramps 37, 38 in such a way that the combined axial length of the four sets of ramps is at a minimum. In other words, the annular member 32 is held in a fully retracted position relative to the carrier 4. The bias of the coil spring 43 then assumes a maximum value, i.e., the intermediate convolutions 46 of the spring 43 are stressed to a maximum extent.

The aforementioned module A includes the support 9, the actuator 11, the rolling elements 15, the bearing 16, the annular member 32 and the coil spring 43. The spring 43 is maintained in the stressed condition during assembly of the module A with the module B including the carrier 4. This means that the wear compensating unit 26 is ready for use as soon as the assembly of the modules A and B is completed. It is preferred to provide the apparatus with means 51 (FIG. 3) for temporarily maintaining the bearing 16 in a position corresponding to the first position of the operating means 19a prior to initial movement of the operating means 19a to the second position in which the clutch 3 is disengaged. The maintaining means 51 can be designed in such a way that the end portion 18a of the inner race 18 of the bearing 16 is actually out of contact with the operating means 19a in the first position of the bearing. Such clearance between the parts 18a and 19a is eliminated in automatic response to the initial disengagement of the clutch 3, i.e., in automatic response to release of the compensating unit 26 so that the latter can perform its function of compensating (when necessary) for wear upon the friction linings 27 and one or more additional components of the clutch.

The initial disengagement of the clutch 3 preferably takes place when the flywheel 73 of the composite flywheel 72 (i.e., of the counterpressure plate of the clutch 3) is not driven by an engine or another prime mover. Alternatively, the initial disengagement of the clutch 3 will preferably take place while the transmission 2 is in neutral. The reason is that the initial actuation does not always involve full disengagement of the clutch. Such initial disengagement is preferably carried out in the plant in which the apparatus 1 and the friction clutch 3 are made or in a plant (e.g., in an automobile making factory) in which the apparatus 1 and the clutch 3 are installed for actual use.

Figure 4:
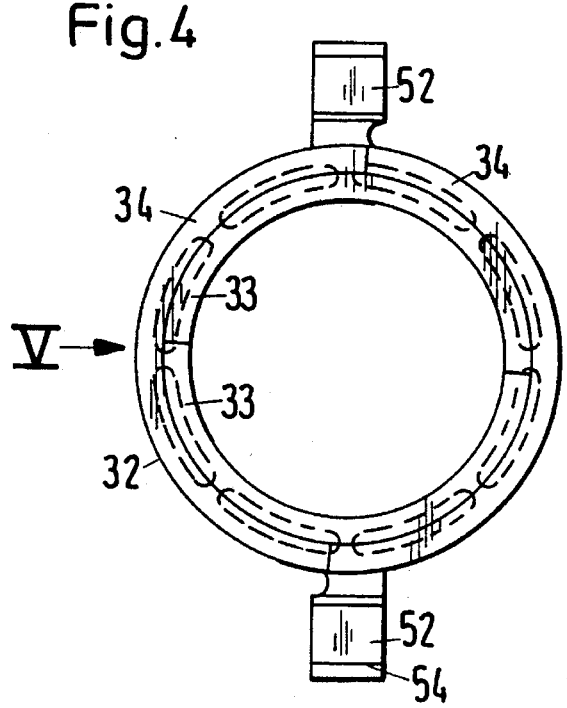
FIG. 4 is a front elevational view of an annular member forming part of the means for moving the bearing of the apparatus in the direction of the axis of the friction clutch.

The maintaining means 51 in the clutch operating apparatus of FIGS. 1 to 7 comprises holding means in the form of lugs 52 carried by the annular member 32. The illustrated lugs 52 are of one piece with the member 32 (FIG. 4). At least the radially inner portions 53 of the lugs 52 are configured in such a way that the lugs can be pivoted relative to the annular main portion of the member 32 in radial planes including the axis X—X. In other words, the radially inner portions 53 can be said to constitute hinges which enable the lugs 52 to pivot relative to the adjacent part of the annular main portion of the member 32. Alternatively, the entire lugs or holding means 52 can be made of a material which renders it possible to flex the lugs relative to the main portion of the member 32. Though FIG. 4 shows that the annular member 32 is provided with only two lugs 52 which are disposed diametrically opposite each other, it is possible to employ three or more lugs which are or which can be equidistant from each other in the circumferential direction of the member 32. The radially outer portions 54 of the lugs 52 abut stops 55 which are provided on (and can be of one piece with) the actuator 11. The stops 55 form part of tongues 56 which (in the apparatus of FIGS. 1 to 7) are of one piece with the actuator 11 and have radially inwardly bent free end portions 57 (FIG. 3). The end portions 57 constitute abutments or stops for the radially outer portions 54 of the neighboring lugs 52.

The resistance of the lugs 52 to buckling and flexing is selected in such a way that the lugs can readily withstand the bias of the coil spring 43 in the axial and circumferential directions of the annular member 32 and actuator 11. At the very least, the lugs 52 can withstand such bias with a minimum of deformation.

The maintaining means 51 should be designed in such a way that it can transmit a torque exceeding that of the fully stressed coil spring 43. To this end, it is desirable to provide an additional (force-locking or form-locking) connection which acts in the circumferential direction of the annular member 32. When the clutch 3 is disengaged for the first time, the actuator 11 is turned about the axis X—X relative to the annular member 32 whereby the stops 55 release the adjacent lugs 52, i.e., the wear compensating unit 26 is rendered operative and can perform is intended function as the wear upon the friction linings 27 progresses. The lugs 52 then assume the positions 52a which are shown in FIG. 3 by dot-dash lines, i.e., they are caused to move their end portions 54 radially inwardly toward the axis X—X.

In assembling the module A of the clutch operating apparatus 1, the coil spring 43 is coupled to the annular member 32 and to the support 9. To this end, the end convolutions of the spring 43 can be provided with hooks or analogous configurations to facilitate their attachment to the parts 9 and 32. The member 32 is thereupon turned relative to the support 9 and/or vice versa in order to ensure that the spring 43 stores a sufficient amount of energy. The aforementioned maintaining means 51 is thereupon actuated to ensure that the member 32 and the support 9 are held in angular positions in which the coil spring 43 remains stressed. The module A is thereafter assembled with the carrier 4 of the module B in such angular position that the ramps 33, 34 of the member 32 properly engage the complementary ramps 37, 38 of the carrier 4. The wear compensating unit 26 is then ready for use as soon as the initial displacement of the bearing 16 in a direction to disengage the clutch 3 is completed.

When the wear upon one or more components (particularly the friction linings 27) of the friction clutch 3 has progressed to a certain extent, the unit 26 compensates for such wear by causing the entire module A to move axially toward the composite flywheel 72. Such movement is shared by that end portion of the bowden wire 22 which is coupled to the motion receiving arm 23 of the actuator 11 as well as by that end portion of the sheath 21 which abuts the tubular guide 24 on the abutment 9a of the support 9. The bowden wire 22 and its sheath 21 are preferably mounted in such a way that they do not generate any forces, or any appreciable forces, which would interfere with required movements of the support 9 and actuator 11 relative to each other. In other words, when not actuated, the flexible coupling 20 should not transmit any appreciable forces or it should transmit no forces at all.

As shown in FIGS. 1 and 3, the motion receiving portion 23 of the actuator 11 and the tubular guide 24 on the abutment 9a of the support 9 are offset relative to each other in the axial direction through a distance 58 (referenced in FIG. 1 only) when the apparatus 1 does not maintain the clutch operating means 19a in a position corresponding to the disengaged condition of the clutch 3. The distance 58 is preferably reduced to zero or at least close to zero when the disengaging force acting upon the operating means 19a of the clutch 3 reaches a maximum value.

It is advisable to design the sloping arcuate surfaces of the cams 13 and 14 in such a way that their angle of slope varies in the circumferential direction of the actuator 11 and support 9 in order to ensure that the progress of the actuating force which is necessary to turn the actuator 11 relative to the support 9 follows a preselected pattern, depending on the circumstances under which the clutch 3 and the apparatus 1 are being put to use. For example, it is desirable under certain circumstances to select the configuration of the sloping surfaces of the cams 13, 14 in such a way that the magnitude of the force which is being transmitted by the flexible coupling 20 or an equivalent of such coupling varies during that longitudinal movement of the bowden wire 22 which is necessary to disengage the clutch 3. This renders it possible to ensure that the magnitude of the disengaging force which is furnished by the coupling 20 and the apparatus 1 is at least substantially constant. Such constancy of the disengaging force can be achieved by properly relating the transmission characteristic of the means 12 for moving the actuator 11 relative to the support 9 to the progress of force which is being applied to the operating means 19a during disengagement of the clutch 3. Thus, if the magnitude of the disengaging force being applied to the operating means 19a increases, the transmission ratio of the moving means 12 increases to thus reduce the magnitude of the force which must be furnished by the flexible coupling 20 or its equivalent.

The sloping surfaces of the cams 13 and 14 can be concave, convex or partly concave and partly convex, either all the way or in part.

FIG. 1 shows that the radius of the bearing 16 matches or at least approximates the radius of the wear compensating unit 26. Thus, the radial distance of the annular member 32 from the axis X—X can match or at least approximate the radial distance of the outer race 17 of the bearing 16 from such axis.

The support 9 and the actuator 11 can be made of metallic sheet material which is hardened, either entirely or at least in the regions of the respective cams 14 and 13. However, it is equally possible to make the support 9 and/or the actuator 11 of a suitable plastic material, for example, when the disengagement of the clutch necessitates the exertion of a relatively small force. This will be described in greater detail hereinafter. If at least one of the parts 9, 11 is made of a plastic material, it is or it can be desirable to embed suitably shaped metallic reinforcing parts (such as tracks, rails or the like) into the part 9 and/or 11 at the respective cams 14 and/or 13. Such reinforcing parts can be hardened prior to being embedded in the plastic material.

Those surfaces of the ramps 33, 34 which come into contact with the respective complementary ramps 37, 38 and those surfaces of the ramps 37, 38 which come into contact with the respective complementary ramps 33, 34 are or can be configured, finished and/or otherwise treated in such a way that the ramps 33, 34 of the annular member 32 can automatically slide along the complementary ramps 37, 38 in a direction to move the member 32 axially and away from the carrier 4 but that the connections between the ramps 33, 34 and 37, 38 are self-locking against movement in the opposite direction, i.e., that the ramps 33, 34 and 37, 38 establish a form-locking connection between the member 32 and the carrier 4 against angular movement of the member 32 in a direction to move it nearer to the transmission 2. For example, the arcuate sloping surfaces of the ramps 33, 34 and/or 37, 38 can be roughened or otherwise finished (e.g., by the provision of rasters or other configurations) which ensure that the member 32 cannot turn in a direction to move it nearer to the transmission 2 even if the member 32 and/or the carrier 4 is caused to perform vibratory, oscillatory and/or other stray movements which would tend to temporarily interrupt direct and full contact between the confronting surfaces of the ramps 33, 34 and the respective complementary ramps 37, 38.

The improved apparatus 1 is particularly suitable for use as a means for engaging and disengaging a friction clutch of the type shown in FIG. 1, namely a clutch wherein the operating means including the tips 19a of prongs 19 is caused to move in the direction of the axis X—X and toward the counterpressure plate including the composite flywheel 72 to thus compensate for wear upon one or more components (particularly the friction linings) of the clutch. In other words, as the wear upon one or more components of the clutch progresses, the operating means including the tips 19a of the prongs 19 is moved in the same direction as the pressure plate 41. This ensures that the inclination of the prongs 19 relative to a plane which is normal to the axis X—X remains at least substantially unchanged irrespective of the extent of wear upon the friction surfaces of the flywheel 61 and pressure plate 41 and/or upon the friction linings 27.

The friction clutch 3 which is shown in FIG. 1 is similar to those described and shown in the commonly owned German patent applications Nos. P 42 39 291.8, P 42 39 289.6, P 42 43 567.6 and P 43 17 586.4 and in the corresponding U.S. patent applications. The disclosures of such U.S. patent applications are incorporated herein by reference.

The purpose of the resilient segments 63 between the two sets of friction linings is to ensure that the engagement of the friction clutch 3 involves a gradual increase of the torque which is being transmitted from the flywheel 61 and pressure plate 41 to the input shaft 6 of the transmission 2. Thus, when the circumferentially complete radially outer main portion 25a of the clutch spring 25 is free to bias the pressure plate 41 toward the counterpressure plate including the flywheel 61, the resilient segments 63 are caused to store energy during a certain initial stage of movement of the pressure plate 41 away from the bottom end wall 59a of the clutch housing 59. The next-following stage of movement of the pressure plate 41 is terminated when the combined axial length of the segments 63 and the two sets of friction linings 27 is reduced to a minimum so that the clutch disc 28 and the input shaft 6 begin to rotate at the exact speed of the flywheel 61. Stated otherwise, the resilient segments 63 bias the two sets of friction linings 27 apart when the clutch 3 is disengaged and permit a gradual movement of the two sets of friction linings toward each other during engagement or reengagement of the clutch.

It is equally within the purview of the invention to replace the illustrated clutch disc 28 with a clutch disc which does not employ resilient segments and/or with a clutch disc which employs one or more dampers between the friction linings and the hub of the clutch disc. Such clutch discs are described and shown in commonly owned U.S. Pat. No. 5,161,660 (granted Nov. 10, 1992 to Huber for "Clutch plate with plural dampers") the disclosure of which is incorporated herein by reference.

The clutch spring 25 is a diaphragm spring which is mounted on the radially extending end wall 59a of the housing 59 in such a way that it acts not unlike a two-armed lever including a radially outer arm (portion 25a) which can bias the pressure plate 41 and a radially inner arm (prongs 19 and their tips 19a) which can be shifted in the direction of the axis X—X by the end portion 18a of the inner race 18 of the bearing 16.

The seat assembly 60 for the clutch spring 25 includes a first seat 64 engaging that side of the clutch spring which faces the pressure plate 41 and a second seat 65 between the clutch spring and the bottom wall 59a of the housing 59. The seat 64 is biased against the clutch spring 25 by a diaphragm spring 66 having a radially outer portion 67 reacting against the housing 59. In the clutch 3 which is shown in FIG. 1, the seat 64 is constituted by a set of tongues which are of one piece with the diaphragm spring 66. The diaphragm spring 66 is installed in stressed condition so that its tongues which constitute the seat 64 are biased against the clutch spring 25 with a certain force which ensures that the opposite side of the spring 25 is maintained in contact with the seat 65.

The diaphragm spring 66 constitutes a sensor of a displacing unit which serves to shift the clutch spring 25 in the direction of the axis X—X away from the bottom wall 59a of the housing 59 and toward the counterpressure plate including the flywheel 61 in order to compensate for wear upon the friction surfaces of the flywheel 61 and pressure plate 41 and/or upon the friction linings 27 of the clutch disc 28. The construction and mounting of the diaphragm spring or sensor 66 are such that it biases the seat 64 against the adjacent side of the clutch spring 25 with an at least substantially constant force during a predetermined stage of axial movement of the seat 65 and the adjacent part of the main portion 25a of the clutch spring 25 toward the flywheel 61. Stated otherwise, the force-to-distance characteristic of the diaphragm spring 66 can be represented by a substantially straight curve. The diaphragm spring 66 opposes and at least substantially counteracts the force which is being applied to the tips 19a of the prongs 19 of the clutch spring 25 during disengagement of the clutch 3. Thus, the bias of the diaphragm spring 66 suffices to balance the maximum force which the end portion 18a of the inner race 18 of the bearing 16 applies to the operating means 19a during disengagement of the clutch 3.

The displacing unit 68 which includes the diaphragm spring 66 is mounted on the rear wall 59a of the housing 59 and serves to automatically shift or displace the seat 65 of the seat assembly 60 in a direction toward the pressure plate 41 in order to compensate for wear upon the friction surfaces of the pressure plate 41 and flywheel 61 and/or upon the friction linings 27 and to thus ensure that the bias of the clutch spring 25 upon the pressure plate 41 remains unchanged in the engaged condition of the clutch regardless of the extent of wear upon the components 41, 61, 27 or at least the component 27 of the clutch. The unit 68 ensures that no clearance develops between the seat 65 and the wall 59a of the clutch housing 59 and/or between the seat 65 and the adjacent side of the main portion 25a of the clutch spring 25.

In addition to the diaphragm spring 66, the displacing unit 68 comprises a spring-biased adjusting element 69 in the form of a ring having an annulus of ramps 70 with surfaces extending in the circumferential direction and sloping in the direction of the axis X—X. The ramps 70 confront the bottom wall 59a of the housing 59 and cooperate with complementary ramps 71 on the bottom wall 59a to ensure that the seat 65 (which is carried by the element 69) is moved in the direction of the axis X—X toward the pressure plate 41 when the element 69 and its ramps 70 are caused to turn relative to the housing 59. The means for biasing the element 69 in a direction to cause its ramps 70 to slide relative to the respective ramps 71 ensures that the extent of axial movement of that portion of the clutch spring 25 which is clamped between the seats 64 and 65 toward the pressure plate 41 matches the extent of axial movement of the element 69 due to angular movement of the element 69 relative to the bottom wall 59a of the housing 59, i.e., the extent of axial movement of the element 69 away from the bottom wall 59a.

Those surfaces of the ramps 70, 71 which contact each other are or can be configured and/or treated in such a way that they do not oppose angular movements of the element 69 in a direction to move it axially of and away from the bottom wall 59a but that they prevent any angular movements of the element 69 in the opposite direction. This can be achieved by providing the sloping surfaces of the ramps 70 and/or 71 with small projections, with otherwise roughened portions, with rasters and/or combinations of such expedients. Satisfactory results can be obtained by shot peening or sand blasting the sloping surfaces of the ramps 70 and/or 71. Even more satisfactory results can be achieved by peening or blasting with coarse particles having a plurality of sharp edges, e.g., with particles of quartz sand. Such coarse particles ensure rapid and pronounced coarsening of the sloping surfaces even if the blasting or peening operation is completed within a short interval of time and even if the intensity of peening or blasting is relatively low. This contributes to lower cost of the coarsening operation and reduces the likelihood of undesirable deformation of the parts (69 and 59a) which carry the ramps 70 and 71. Peening with spherical particles is also possible even though it must involve the propulsion of spherical particles against the sloping surfaces of the ramps 70 and/or 71 with a highly pronounced intensity in order to ensure that the ramps 71 can successfully oppose rotation of the element 69 and its ramps 70 in a direction to move the element 69 closer to the bottom wall 59a of the clutch housing 59. This might even involve some undesirable or unnecessary deformation of the ramps 70 and/or 71. Therefore, blasting with coarse particles of quartz or the like is preferred at this time.

The aforediscussed treatment of sloping surfaces on ramps or cams can be resorted to with equal or similar advantage in connection with the treatment of the sloping surfaces of the cams 13, 14, of the ramps 33, 34 and/or of the ramps 37, 38. Furthermore, it is not always necessary to roughen the sloping surfaces of cams or ramps or to roughen or similarly treat only the sloping surfaces of ramps or cams which cooperate with each other in a manner as described and shown in connection with the cams 13, 14 of the moving means 12, with the ramps 33, 34 and 37, 38 of the compensating unit 26, and/or with the ramps 70, 71 of the displacing unit 68. All that counts is to ensure that the cams 13 can turn relative to the corresponding cams 14 only in a single direction, that the ramps 33, 34 can turn relative to the ramps 37, 38 in a single direction and that the ramps 70 can turn relative to the ramps 71 in a single direction. By way of example, the sloping surfaces of the ramps 33, 34 and/or 37, 38 need not be roughened if the frustoconical surface 35 of the annular member 32 and/or the complementary frustoconical surface 36 of the support 9 is treated in such a way that the member 32 can be turned relative to the support only in a direction to move it further away from the transmission 2. In other words, any and all angular movement of the cams 13 and/or ramps 33, 34 and/or ramps 70 in a wrong direction can be prevented by suitable treatment of the sloping surfaces of such cams and/or ramps and/or by suitable treatment of the parts (such as the actuator 11, the support 9 and a part of the housing 59 other than the bottom wall 59a) which are in direct surface-to-surface contact with the actuator 11, annular member 32 and element 69.

As a rule, the tendency of the cams 13, of the ramps 33, 34 and/or of the ramps 70 to turn in the wrong direction would be attributable to minute vibratory, oscillatory or other stray movements of parts which should be limited to angular movement in a single direction. In many instances the stray movements (which can take place at a high frequency) are caused primarily by axial vibrations and/or flexing of the input element (e.g., the camshaft or the crankshaft of an engine in a motor vehicle) which drives the flywheel 73 of the composite flywheel 72. The stray movements are transmitted to the flywheels 61 and 73 so that the counterpressure plate of the clutch performs axial and/or pendulum or similar movements which are transmitted to other parts of the clutch 3 as well as to the clutch operating apparatus 1.

All additional details of presently preferred embodiments of the displacing unit 68 which can be utilized in the friction clutch 3 or an analogous clutch are fully disclosed in the aforementioned commonly owned German patent applications and in the corresponding U.S. patent applications.

FIG. 1 further shows an antifriction bearing 74 between the flywheels 61, 73 of the composite flywheel or counterpressure plate 72. The damper 75 between the flywheels 61 and 73 comprises two sets of arcuate energy storing elements in the form of coil springs which oppose rotation of the flywheels 61 and 73 relative to each other. A similar damper is described and shown in detail in the aforementioned commonly owned U.S. Pat. No. 5,180,336 to Maucher et al. to which reference may be had, if necessary.

An important advantage of the compensating unit 26 is that it can be readily incorporated into the clutch operating apparatus and occupies a small amount of space, not only in the direction of the axis X—X but also radially of such axis. In the apparatus 1 of FIGS. 1 to 7, the compensating unit 26 is installed between the carrier 4 and the support 9. However, it is also possible to install the compensating unit between the case of the transmission 2 and the carrier 4 (which is then movable relative to the transmission in the direction of the axis X—X) or between the carrier 4 and a member which is mounted on the case of the transmission 2. Furthermore, and while FIG. 1 shows that the actuator 11 and the bearing 16 are two separately produced devices, it is also possible to make the bearing of one piece with such actuator; for example, the outer race 17 of the bearing 16 can be of one piece with the actuator 11. The bearing 16 can constitute or can be replaced with a so-called self-centering bearing.

The ratio of the force which is necessary to disengage the clutch 3 to the force which is required to engage the clutch can be selected to match a desired value by appropriate selection of the angles 40 and 39 which are shown in FIGS. 5 and 7, respectively. Furthermore, and as already mentioned above, the angle 39 and/or 40 need not be constant from end to end of the respective ramp 37, 38 or 33, 34. By varying the angle 39 and/or 40 one can vary the aforementioned ratio during engagement or disengagement of the clutch.

In addition to the previously discussed undertakings (such as sand blasting or ball peening) for preventing angular movements of the actuator 11, annular member 32 and/or element 69 in the wrong direction, it is also possible to achieve such result by appropriate selection of the friction characteristics of the parts which are provided with complementary cams and/or with complementary ramps and/or by appropriate selection of the angles of slope of the surfaces on the complementary cams and/or on the complementary ramps. All that counts is to ensure that the actuator 11, the annular member 32 and the annular element 69 act not unlike freewheels which can be rotated in one direction in response to the application of a relatively small force but cannot be rotated in the opposite direction (e.g., because of self-locking action which develops in automatic response to attempted rotation of the actuator 11, annular member 32 and annular element 69 in the other (i.e., wrong) direction). Proper selection of the materials of the complementary cams and ramps and/or proper finish of the sloping surfaces of the cams and ramps in order to achieve the aforementioned self-locking action is preferred at this time because the actuator 11, the annular member 32 and the annular element 69 can be prevented from turning in the wrong direction without the need for any additional parts which must be provided for the sole purpose of preventing any rotation of the actuator 11, member 32 and/or element 69 in the wrong direction. However the utilization of such additional parts which are designed to ensure that the actuator 11, the member 32 and the element 69 will act not unlike freewheels is also within the scope of the present invention.

The coil spring 43, which forms part of the compensating unit 26 and serves to rotate the element 69 in a direction to move such element toward the pressure plate 41 in order to compensate for wear upon the components 61, 41, 27 or at least upon the component 27, is installed, configured and stressed in such a way that it does not interfere with the function of the clutch spring 25 and/or diaphragm spring (sensor) 66. At the same time, the spring 43 should store sufficient amounts of energy to ensure that the axial position of the annular element 69 can be changed during the entire useful life of the apparatus 1 and clutch 3 in order to compensate for wear at least upon the friction linings 27.

The clutch 3 of FIG. 1 is a push-type clutch because the operating means 19a must be depressed toward the pressure plate 41 (rather than pulled in a direction away from the pressure plate) in order to disengage the clutch.

FIG. 8 shows a modified clutch operating apparatus 101 which comprises a ring-shaped support 109 adapted to be affixed to a housing or the like by means of threaded fasteners 105 or in another suitable way. A ring-shaped actuator 111 of the apparatus 101 is mounted for rotation and for axial movement relative to the support 109. The means 112 for moving the actuator 111 relative to the support 109 in the axial direction of the apparatus 101 includes two sets of ramps or cams corresponding to the cams 13 and 14 of the moving means 12 shown in FIG. 1 and rolling elements 115. The actuator 111 comprises an axial extension 111a which is surrounded by the axially extending portions 109a of the support 109.

The apparatus 101 further comprises a bearing 116 having an inner race 118 which can act upon the operating means of a clutch in the same way as described in connection with the race 18 of the bearing 16 and the clutch operating means 19a of the apparatus 1 and clutch 3 shown in FIG. 1. The bearing 116 is mounted on and has freedom of limited radial movement relative to a carrier 107. Such limited freedom of radial movement ensures that the bearing 116 can be automatically centered relative to the operating means of the clutch (not shown) which is to be operated by the apparatus 101. The compensating unit 126 of the apparatus 101 is mounted between the carrier 107 and the actuator 111 to move (when necessary) the bearing 116 in a direction to the left (as viewed in FIG. 8) in order to compensate for wear upon the pressure plate and the counterpressure plate and/or the friction linings of the clutch.

The compensating unit 126 comprises two annular members 126a, 126b which are provided with sets of circumferentially extending ramps having surfaces which slope in the direction of the axis of the bearing 116, for example, in a manner as described in connection with the ramps 33, 34 of the annular member 32 and the ramps 37, 38 of the carrier 4 shown in FIG. 1. The annular member 126a is carried by the actuator 111 and is preferably nonrotatably affixed thereto. The connection between the annular member 126a (which can be made of a plastic material) and the actuator 111 can comprise axially extending snap fasteners 130. The annular member 126b is (or can be) also made of a plastic material and is supported by the carrier 107 for the bearing 116. The carrier 107 is nonrotatably connected with but can move in the axial direction of the actuator 111. The annular member 126b is free to turn relative to the annular member 126a, actuator 111 and carrier 107.

If the compensating unit 126 is to carry out its compensating action, the annular member 126b must be turned by at least one energy storing element 143 (e.g., an arcuate coil spring). The radially outer portions of the convolutions of the arcuate energy storing element 143 abut an axially extending portion 131 of the annular member 126b. The portion 131 defines an arcuate radially outwardly extending channel or groove bounded by a concave surface which maintains the energy storing element 143 in a desired axial position relative to the annular member 126b. The energy storing element 143 reacts against the carrier 107 and bears upon the annular member 126b so that the member 126b is urged to turn relative to the annular member 126a. The carrier 107 is provided with at least one axially extending retainer 107a for one end convolution of the energy storing element 143. FIG. 8 shows that the energy storing element 143 is disposed radially inwardly of the moving means 112 and in at least partial radial alignment with the cams or ramps of the moving means 112.

The means for turning the actuator 111 in order to move the bearing 116 in a direction toward the pressure plate of the clutch is shown in FIG. 9. The turning means can include a straight wire which can be made from a non-resilient material or (and as actually shown in FIG. 9) the turning means can comprise a substantially Z-shaped link or yoke 144 which can be flexed between its end portions 145 and 146 to an extent depending upon the magnitude of the applied forces. The link 144 is made of a resilient material so that it can reassume its normal shape when the intensity of the applied force is reduced, e.g., to zero. The Z-shaped configuration of the link 144 facilitates its flexing in response to the application of forces which are required to turn the actuator 111 for the purpose of disengaging the clutch, which has its operating means adjacent the race 118 of the bearing 116.

The link 144 extends through an opening 148 in a wall 147 forming part of the transmission housing. The end portion 145 of the link is coupled with the actuator 111 of the clutch operating apparatus 101, and the end portion 146 of the link 144 is coupled to the clutch pedal (not shown) or to an actuator or connecting element operating on the apparatus 1 and thus the clutch 3 (not shown) of a motor vehicle. Such a mode of coupling the actuator to a device which causes the actuator to move in order to initiate the disengagement of a clutch which is operated by the apparatus 101 contributes to the simplicity of the apparatus. Furthermore, since the end portion 146 of the link 144 is adjacent to the exterior of the transmission housing, a bowden wire 149 connected to the clutch pedal is much less likely to be contaminated by impurities, such as fragments of the friction linings (which are produced as a result of wear upon the clutch disc) as well as other contaminants. Still further, the bowden wire 149 is not exposed to elevated temperatures which develop in the housing, including the wall 147.

Another important advantage of the link 144 is that it prevents the transmission of vibratory, oscillatory and/or other stray movements to the clutch pedal or actor when the clutch and the clutch operating apparatus are installed in a motor vehicle. Certain parts of the apparatus are likely to carry out undesirable stray movements in response to axial oscillations of the output element (e.g., a crankshaft or a camshaft) of the engine which drives the counterpressure plate of the clutch. Axial oscillations are the cause of self-induced vibratory or other stray movements of the pressure plate (such as the pressure plate 41 in the clutch 3 of FIG. 1).

Still another important advantage of the structure which is shown in FIG. 9 is that one can dispense with the customary disengaging lever which is necessary in conventional clutch operating apparatus to move the bearing relative to the operating means of the clutch. Such disengaging lever is normally mounted next to the transmission and constitutes a rather bulky component part which is likely to perform stray movements in response to vibration, oscillation and/or other stray movements of the output shaft of the prime mover.

The rolling elements 15 of the moving means 12 shown in FIGS. 1 and 3, and the corresponding rolling elements 115 in the moving means 112 of FIG. 8 exhibit the advantage that they prevent the development of play between the bearing 16 or 116 and the adjacent parts, particularly a tilting of the bearing relative to the adjacent parts. As shown in FIG. 2, the moving means 12 preferably comprises at least three equidistant rolling elements 15. The same applies for the moving means 112 in the apparatus 101 of FIG. 8.

The moving means 12 and/or 112 can also serve as a means for balancing or as a means for compensating for tolerances in the axial direction of the apparatus 1 or 101. Otherwise stated, the moving means 12 and/or 112 can ensure that the combined axial length of the output element (e.g., the crankshaft) of the prime mover, the counterpressure plate (such as the composite flywheel 72 in the clutch 3 of FIG. 1), the position of the tips 19a of the prongs 19 forming part of the clutch spring 25 relative to the counterpressure plate, the apparatus 1 or 101, and the distance from the wall of the transmission housing or case matches or closely approximates the desired or optimal axial length.

FIGS. 10a and 10b illustrate two presently preferred configurations of the cams 13, 14 forming part of the moving means 12 or the cams forming part of the moving means 112. The character 150 denotes the bowden wire and the characters 151 and 151a respectively denote the slope angles of the confronting surfaces of the complementary cams. The angle 151 is constant and, therefore, the transmission in the direction of disengagement (arrow 152) remains unchanged. If the confronting surfaces of the complementary cams are configured in a manner as shown in FIG. 10b, the transmission in the direction of the arrow 152 varies in a manner as indicated at 151a. FIGS. 10a and 10b show that it is possible to select the progress of the clutch disengaging force in a manner which is best suited for a specific use of the combination of a clutch and the improved clutch operating apparatus.

FIG. 11 illustrates a modified construction of the means for turning the actuator of the clutch operating apparatus for the purpose of moving the bearing 16 or 116 in order to change the condition of the clutch. The link 144 of FIG. 9 is replaced by a resilient connector 144a' in the form of a coil spring having a set of convolutions 145a', a first end portion 145b' carrying a connector 145' for attachment to the actuator (such as 11), and a second end portion 146b' connectable at 146' to a pedal or actor by a bowden wire 149'. The connector 144a' constitutes an energy storing element which can store a desired amount of energy as a result of axial stressing. Thus, the coiled median portion of the stressed spring 144a' will undergo elastic deformation after the magnitude of the force acting upon the end portions 145b' and 146b' reaches a preselected value. An advantage of the resilient connector 144a' of FIG. 11 is that, when the apparatus including the structure of FIG. 11 is utilized in a motor vehicle, vibratory and/or other stray movements, which develop when the RPM of the engine is within a certain range or within one of several ranges and would normally be transmitted to the bowden wire 149', are damped or fully compensated for by the resilient element 144a'. The initial stressing of the resilient element 144a' can be between about 100N and 350N, depending upon the circumstances of use.

FIG. 12 illustrates a further clutch operating apparatus 201 which comprises a support 209 connectable to the housing or case of a transmission having an input shaft 206, and an actuator 211. The support 209 and the actuator 211 are made of a plastic material. A suitable plastic material is a thermoplast, such as a polyamide, and the plastic parts 209, 211 can be reinforced by embedding glass fibers and/or carbon fibers or other suitable fibers into the plastic material. A similar plastic material (with or without reinforcing fibers) can be utilized for the making of the annular member 226b of the wear compensating unit 226 as well as for the making of the annular member 126a and/or 126b forming part of the compensating unit 126 shown in FIG. 8.

The spherical rolling elements 215 are in direct contact with the plastic support 209 and the plastic actuator 211. It is often desirable to provide at least one of the plastic parts 209, 211 with inserts (e.g., metallic inserts) which define the actual tracks being contacted by the rolling elements 215. In the embodiment of FIG. 12, the ramps of the wear compensating unit 226 are configurated in such a way that they constitute self-locking threads. The threads can be single threads or multiple threads. The actuator 211 carries a first thread and the annular member 226b carries a second thread complementary to the first thread. The angle of slope of the helical ramps provided on the actuator 211 and annular member 226b can be in the range of between about 6° and 20°, preferably between about 12° and 18°, depending upon the desired transmission ratio. Such angle is defined by the ramps and a plane which is normal to the axis of rotation of the member 226b and other rotary constituents of the apparatus 201. It is presently preferred to select the angle in such a way that the ramps of the actuator 211 and annular member 226b are in self-locking engagement with each other in response to the application of a force in the axial direction of the compensating unit 226. Thus, the bearing, including the inner race 218 of FIG. 12, can be moved in a direction toward the pressure plate of the clutch which is being operated by the apparatus 201 only when the coil spring 243 of the unit 226 is free to turn the annular member 226b in a direction to advance the bearing so that the axial displacement of the bearing compensates for wear upon one or more components (particularly the friction linings) of the clutch. One end portion of the spring 243 reacts against the support 209 and its other end portion bears upon the annular member 226b. To this end, the end portions of the spring 243 extend radially of the axis of rotation of the member 226b and prevent the spring from turning relative to the actuator 211 and/or annular member 226b.

As can be seen in FIG. 12, the coil spring 243 of the wear compensating unit 226 is disposed radially inwardly of the annular member 226b and its axis coincides with or is parallel to the axis of the input shaft 206 of the transmission. When the clutch which is controlled by the apparatus 201 is engaged, the spring 243 causes the free end portion of the rotary inner race 218 of the bearing to apply a predetermined axial force to the tips of the prongs 219 (one shown in FIG. 12 by phantom lines).

The rotary actuator 211 of the apparatus 201 shown in FIG. 12 comprises cams forming part of the moving means 212 as well as ramps or threads forming part of the compensating unit 226. The annular member 226b includes portions 227 forming part of a locking or blocking device 228 which maintains the member 226b in a retracted position (with reference to the support 209) preparatory to and during mounting of the apparatus 201 in a motor vehicle or another machine. The locking device 228 can be said to constitute a detent assembly including male detents 227 on the annular member 226b and complementary female detents 229 on the support 209. The female detents 229 include a set of tongues having recesses or sockets for the male detents 227. The resistance of the properly engaged locking or blocking device 228 must be overcome in response to initial actuation of the apparatus 201, i.e., the compensating unit 226 is operative upon the initial disengagement of the clutch which is operated by the apparatus 201. The tongues of the female detents 229 are elastically deformable in the radial direction of the annular member 226b.

The annular member 226b of the compensating unit 226 is further provided with axially parallel extensions 230 constituting handgrip portions which can be manipulated by the fingers of an operator who wishes to turn the member 226 relative to the support 209. The extensions or handgrip portions 230 can be manipulated by an operator upon removal of the engine and the transmission from a motor vehicle in order to return the annular member 226b to its retracted position in which it is separably coupled to the actuator 211 by the detents 227, 229 of the blocking device 228. The annular member 226b can remain locked to the support 209 until after the engine and the transmission as well as the power train between the output element of the engine and the input shaft 206 of the transmission are reinstalled in the motor vehicle.

The clearance or gap 249 which develops between the support 209 and the actuator 211 during disengagement of the clutch by the bearing including the rotary inner race 218 can be at least nearly completely sealed by one or more sealing devices, e.g. by one or more covers or the like. For example, the support 209 and the actuator 211 can comprise axially extending portions which are slidably telescoped into each other. Reference may be had to FIG. 13 which shows an axially extending tubular portion 309a forming part of the support 309 and being slidably telescoped into the axially extending portion 311a of the actuator 311.

As already described with reference to and shown in FIGS. 1, 8 and 12, the apparatus 1, 101 or 201 can be secured to the transmission case or housing by bolts or other suitable threaded fasteners (note the fasteners 5 in FIG. 1 and the fasteners 105 in FIG. 8). However, it is equally within the purview of the invention to replace the threaded fasteners (or to employ such threaded fasteners jointly) with other suitable coupling or attaching means. For example, the fasteners (such as 5 or 105) can be employed with or can be replaced by a device which can adequately mount the clutch operating apparatus on the case or housing of a transmission (such as the transmission 2 shown in FIG. 1) in response to axial movement of the apparatus relative to the input shaft of the transmission. Alternatively, the connection between the transmission case and the clutch operating apparatus can include complementary parts which can be moved into reliable frictional engagement with each other. The utilization of substitutes for or additions to threaded fasteners can contribute to significant simplification and lower cost of installation of the apparatus 1, 101, 201 or equivalent apparatus under the hood of a motor vehicle. For example, the carrier 4 or the support 109 or 209 can be provided with axial extensions which can be caused to snap into complementary recesses or sockets of the transmission case to establish a frictional or form-locking connection between the transmission and the clutch operating apparatus.

FIG. 12 shows that the apparatus 201 further comprises a snap-in or plug-in connection or coupling 245 between the member 244 (corresponding to the member 144 or 144a') and the ring-shaped actuator 211. The connection or coupling 245 permits some relative movements of the actuator 211 and the member 244. The illustrated coupling 245 comprises a spherical portion 246 which is provided on the actuator 211 and a complementary socket or recess 247 in an elastic member 248 preferably made of a plastic material and being secured to the member 244. The member 248 acts not unlike a clip and need not necessarily be made of a plastic material; for example, such member can be made (at least in part) of spring steel.

As can be seen in FIGS. 8 and 12, the apparatus 101 and 201 can be provided with sealing elements 153 and 253, respectively. Such sealing elements are effective in the radial direction and establish simple but efficient seals between the case of a transmission (such as the transmission 2 shown in FIG. 1) and the input shaft (6 in FIG. 1, 206 in FIG. 12) of the transmission. The sealing elements 153, 253 are or can be mounted on the apparatus 101, 201 in the manufacturing plant so that they are ready to be slipped onto the input shaft and to engage the transmission case when the mounting of the apparatus in the power train between the transmission and the prime mover is completed. The element 153 or 253 then seals the clearance between the periphery of the input shaft and the case of the transmission.

The clutch operating apparatus which includes the structure shown in FIG. 13 includes a self-centering bearing 316 which is held by a resilient element 354, e.g., a diaphragm spring. The resilient element 354 includes axially extending tongues or prongs 355 which are or which can be welded to or made of one piece with the main portion of the element 354. The tongues 355 cooperate with complementary portions of a disc-shaped member 356 carried by the annular member 326b of the compensating unit. The connection between the resilient element 354 and the disc-shaped member 356 on the annular member 226b is self-locking in the axial direction. The member 356 is flat and is secured to the member 226b by an axial snap-on fastener device 357. The bearing 316 has some freedom of radial movement relative to the member 326b.

The rolling elements (such as the elements 15 forming part of the moving means 12 shown in FIG. 1) can be installed in a cage (not specifically shown) which serves to maintain such rolling elements at a selected distance from each other as seen in the circumferential direction of the respective moving means. Such mounting of the rolling elements even further reduces the likelihood of undesirable tilting of the parts which are provided with the cams (such as 13 and 14) cooperating with the rolling elements to effect controlled axial movements of one of such parts relative to the other part. For example, a cage for the rolling elements 15 in the moving means 12 of FIG. 1 reduces the likelihood of tilting of the actuator 11 (and hence the bearing 16) relative to the support 9.

The improved clutch operating apparatus is susceptible of numerous additional modifications without departing from the spirit of the invention. For example, the features of the apparatus 1 of FIGS. 1 to 7 can be combined or used interchangeably with the features of the apparatus shown in FIGS. 8, 12 and 13. Furthermore, the features of the illustrated and described clutch operating apparatus can be embodied in apparatus which are to be used to operate clutches other than that shown in FIG. 1, for example, clutches of the type disclosed in the aforementioned commonly owned U.S. patent applications.

Still further, at least some of the features of the illustrated clutch operating apparatus or of the illustrated combinations of the improved apparatus with friction clutches or other suitable clutches are believed to be sufficiently novel and unobvious to warrant independent patent protection, either alone or in combination with certain other constituents of the apparatus. The same applies for the aforedescribed novel and improved methods of installing the apparatus in a motor vehicle or elsewhere, of combining the improved apparatus with a clutch, and of assembling the component parts of the improved apparatus.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. Apparatus for operating a clutch, particularly a friction clutch located between a prime mover and a transmission, said clutch having operating means rotatable about a predetermined axis and movable in the direction of said axis between first and second positions in which the clutch is respectively engaged and disengaged and said operating means being moved in the direction of said axis as a result of progressing wear upon at least one component of the clutch, comprising:

a bearing including a rotary portion movable in the direction of said axis to move said operating means from one to the other of said positions;

a carrier;

at least one support mounted on said carrier;

an actuator mounted on said at least one support for rotation about said axis relative to said at least one support and for movement relative to said carrier in the direction of said axis to thus move said operating means from one to the other of said positions by way of said bearing;

means for moving said actuator relative to said at least one support in the direction of said axis in response to rotation of said actuator relative to said at least one support; and means for at least partially compensating for said wear, including means for moving said bearing in the direction of said axis relative to said carrier.

2. The apparatus of claim 1, wherein said carrier is mounted on the transmission.

3. The apparatus of claim 1, wherein said compensating means is installed between said carrier and said at least one support.

4. The apparatus of claim 1, wherein said at least one support is movable relative to said carrier in the direction of said axis.

5. The apparatus of claim 1, further comprising means for non-rotatably securing said at least one support to said carrier.

6. The apparatus of claim 1, wherein said carrier comprises a tubular portion and said at least one support is movable relative to said tubular portion in the direction of said axis.

7. The apparatus of claim 6, wherein said at least one support includes a radially inner tubular portion, one of said tubular portions being surrounded by the other of said tubular portions and the radially inner tubular portion of said at least one support being movable relative to the tubular portion of said carrier in the direction of said axis.

8. The apparatus of claim 1, wherein said at least one support is disposed intermediate said actuator and said compensating means.

9. The apparatus of claim 1, wherein said bearing is mounted on said actuator.

10. The apparatus of claim 1, wherein said means for moving said actuator relative to said at least one support includes at least one first cam on said actuator and at least one complementary second cam provided on said at least one support and cooperating with said at least one first cam to move said actuator relative to said at least one support in the direction of said axis in response to rotation of said actuator relative to said at least one support.

11. The apparatus of claim 10, wherein said means for moving said actuator relative to said at least one support further comprises rolling elements between said first and second cams.

12. The apparatus of claim 1, wherein said compensating means comprises ramps.

13. The apparatus of claim 12, wherein said ramps slope in the direction of said axis.

14. The apparatus of claim 13, wherein said ramps include at least one first set of ramps and at least one second set of ramps, the ramps of said at least one first set being turnable about said axis relative to the ramps of said at least one second set.

15. The apparatus of claim 14, wherein the ramps of said at least one second set are non-rotatably secured to said carrier.

16. The apparatus of claim 15, wherein the ramps of said at least one first set are provided on an annular member of said means for moving said bearing in the direction of said axis, said annular member being rotatable about said axis relative to said carrier.

17. The apparatus of claim 16, wherein said annular member is movable relative to said carrier in the direction of said axis.

18. The apparatus of claim 17, wherein said annular member forms part of a power train between said carrier and said at least one support.

19. The apparatus of claim 16, wherein said at least one support is directly coupled to said annular member against movement in the direction of said axis.

20. The apparatus of claim 1, wherein said means for moving said actuator relative to said at least one support is disposed at a first radial distance from said axis and said compensating means is disposed at a lesser second radial distance from said axis.

21. The apparatus of claim 1, wherein said bearing is disposed at a first distance from said carrier, as seen in the direction of said axis, and said compensating means is disposed at a second distance from said carrier, said second distance being at least close to said first distance.

22. The apparatus of claim 1, wherein said at least one support includes a tubular portion and said means for moving said bearing includes an annular member at least partially surrounding said tubular portion.

23. The apparatus of claim 1, wherein said compensating means further includes at least one first set of ramps and at least one second set of ramps complementary to the ramps of said at least one first set, the ramps of one of said at least one first set and said at least one second set being turnable about said axis relative to the ramps of the other of said at least one first set and said at least one second set and each ramp of said at least one first set having a first surface abutting a second surface of one of said at least one second set of ramps, said first surfaces and the respective second surfaces being in self-locking engagement with each other and being inclined relative to a plane normal to said axis.

24. The apparatus of claim 23, wherein the surfaces of said ramps are inclined relative to said plane at angles of between about 3° and 15°.

25. The apparatus of claim 24, wherein said angles are between about 4° and 10°.

26. The apparatus of claim 1, wherein said compensating means further includes at least one first set of ramps and at least one second set of ramps each complementary to and abutting a ramp of said at least one first set, the ramps of said at least one second set being rotatable about said axis relative to and being slidable along the respective ramps of said at least one first set, said compensating means further including resilient means for urging said at least one second set of ramps to rotate relative to the ramps of said at least one first set in a direction to compensate for said wear.

27. The apparatus of claim 26, wherein said resilient means comprises at least one coil spring surrounding at least a portion of a rotary annular member of said means for moving said bearing in the direction of said axis relative to said carrier.

28. The apparatus of claim 26, wherein the ramps of said at least one second set form part of a power train between the ramps of said at least one first set and said bearing, and said resilient means is operative to move the ramps of said at least one second set in the direction of said axis and to thus move the operating means in the direction of said axis by way of said bearing, whereby the bearing moves relative to said carrier in the direction of said axis to compensate for wear upon the at least one component of the clutch.

29. The apparatus of claim 1, wherein said means for moving said bearing in the direction of said axis to compensate for wear upon the at least one component of the clutch includes an annular member which is rotatable about said axis relative to said at least one support, said compensating means further including means for limiting the extent of rotation of said annular member relative to said at least one support.

30. The apparatus of claim 1, wherein said bearing is movable relative to said carrier in the direction of said axis through a first distance to move said operating means between said first and second positions, said means for moving said bearing in the direction of said axis including an annular member movable in the direction of said axis through a second distance which at least approximates said first distance.

31. The apparatus of claim 30, wherein said means for moving said actuator relative to said at least one support includes at least one first cam provided on one of said carrier and said at least one support, and at least one complementary second cam movable relative to said at least one first cam to thereby move said actuator and said bearing in response to rotation of said actuator relative to said at least one first cam.

32. The apparatus of claim 1, wherein said means for moving said bearing in the direction of said axis to compensate for said wear includes an annular member rotatable about said axis relative to said at least one support, and first and second cams respectively provided on said at least one support and said annular member to move said annular member and the bearing in the direction of said axis relative to said at least one support in response to rotation of said annular member relative to said at least one support, said cams including means for limiting the extent of rotation of said annular member relative to said at least one support.

33. The apparatus of claim 32, wherein said compensating means further includes at least one rolling element between said first and second cams, said cams having end portions and said limiting means including stops provided at the end portions of said cams.

34. The apparatus of claim 1, further comprising means for limiting the extent of movability of said bearing in the direction of said axis relative to said carrier.

35. The apparatus of claim 34, wherein said means for limiting includes means for limiting the extent of rotation of an annular member of said compensating means relative to one of said carrier and said at least one support.

36. The apparatus of claim 1, wherein said at least one support is movable relative to said carrier in the direction of said axis and further comprising means for limiting the extent of movability of said at least one support relative to said carrier.

37. The apparatus of claim 36, wherein said means for limiting comprises complementary detents provided on said at least one support and said carrier, and being engageable with each other by snap action.

38. The apparatus of claim 1, further comprising means for temporarily maintaining said bearing in a position corresponding to the first position of the operating means prior to initial movement of said operating means to said second position.

39. The apparatus of claim 38, wherein said means for maintaining includes means for holding said means for moving said bearing in a position which the bearing assumes in the absence of wear upon the at least one component of the clutch.

40. The apparatus of claim 38, wherein said means for maintaining is disposed between said carrier and a rotary annular member of said means for moving said bearing relative to said carrier.

41. The apparatus of claim 1, further comprising means for blocking the movement of said bearing by the moving means in a direction to compensate for wear upon the at least one component prior to initial disengagement of the clutch.

42. The apparatus of claim 1 for operating a clutch wherein a counterpressure plate is rotatable about said axis and a pressure plate is rotatable with and has limited freedom of axial movement relative to the counterpressure plate and wherein the operating means includes at least one clutch spring which biases the pressure plate against a rotary clutch disc between the pressure plate and the counterpressure plate in the engaged condition of the clutch and the at least one component includes friction linings provided on the clutch disc and being clamped between the pressure plate and the counterpressure plate in the engaged condition of the clutch and wherein the pressure plate moves nearer to the counterpressure plate in response to progressing wear upon the friction linings, the at least one clutch spring having a portion which is engaged by said bearing in the disengaged condition of the clutch, further comprising means for displacing the at least one clutch spring in the direction of said axis in response to progressing wear upon the friction linings so that the bias of the at least one clutch spring upon the pressure plate in the engaged condition of the clutch remains at least substantially unchanged irrespective of the extent of wear upon the friction linings.

43. The apparatus of claim 42 for operating a clutch wherein a housing is rotatable about said axis with the pressure plate and the counterpressure plate and a seat is provided on the housing to tiltably mount the at least one clutch spring and the at least one spring includes a first arm engaging the pressure plate in the engaged condition of the clutch and a second arm which is engaged by said bearing at least in the disengaged condition of the clutch, said displacing means including means for biasing the at least one clutch spring against the seat and said means for moving said bearing in the direction of said axis including an annular member arranged to bias said operating means with a force which increases in response to progressing wear upon the friction linings to thus overcome the force of said biasing means.

44. The apparatus of claim 43, wherein said compensating means further includes means for moving said annular member in the direction of said axis toward the counterpressure plate to an extent which at least compensates for the extent of movement of the pressure plate nearer to the counterpressure plate as a result of wear upon the friction linings.

45. The apparatus of claim 1 for operating a clutch having a counterpressure plate comprising a plurality of flywheels rotatable relative to each other about said axis and at least one damper between the flywheels, said means for moving said actuator including means for shifting the actuator relative to the counterpressure plate in response to wear upon the at least one component of the clutch.

* * * * *

UNITED STATES PATENT AND TRADEMARK OFFICE
CERTIFICATE OF CORRECTION

PATENT NO. : 5,588,517
DATED : December 31, 1996
INVENTOR(S) : Ad Kooy et al.

It is certified that error appears in the above-indentified patent and that said Letters Patent is hereby corrected as shown below:

On title page, [30], Foreign Application Priority Data, change "43 30 886.4" to --P 43 30 886.4--; and change "44 18 023.3" to --P 44 18 023.3--.

Signed and Sealed this

Twenty-second Day of April, 1997

*Attest:*

BRUCE LEHMAN

*Commissioner of Patents and Trademarks*

*Attesting Officer*